Figure 1:
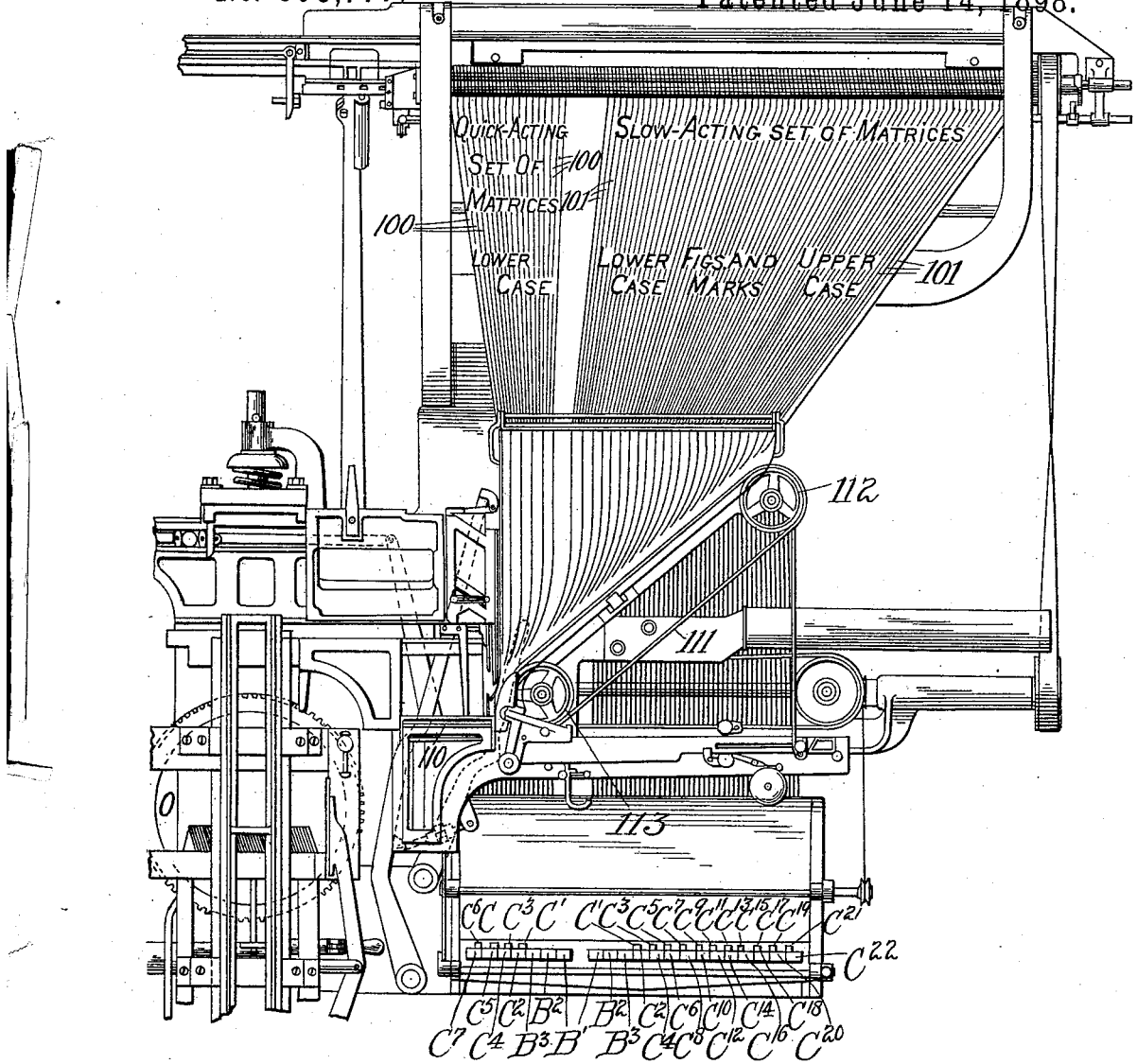

(No Model.)　　　　　　　　　　9 Sheets—Sheet 4.
T. CAHILL.
LINOTYPE MACHINE, LINE CASTING MACHINE, AND MACHINE FOR MAKING TYPE BARS, LINOTYPES, AND MATRICES.
No. 605,777.　　　　　　　Patented June 14, 1898.

Attest
Walter Donaldson
Arthur T. Cahill

Inventor
Thaddeus Cahill

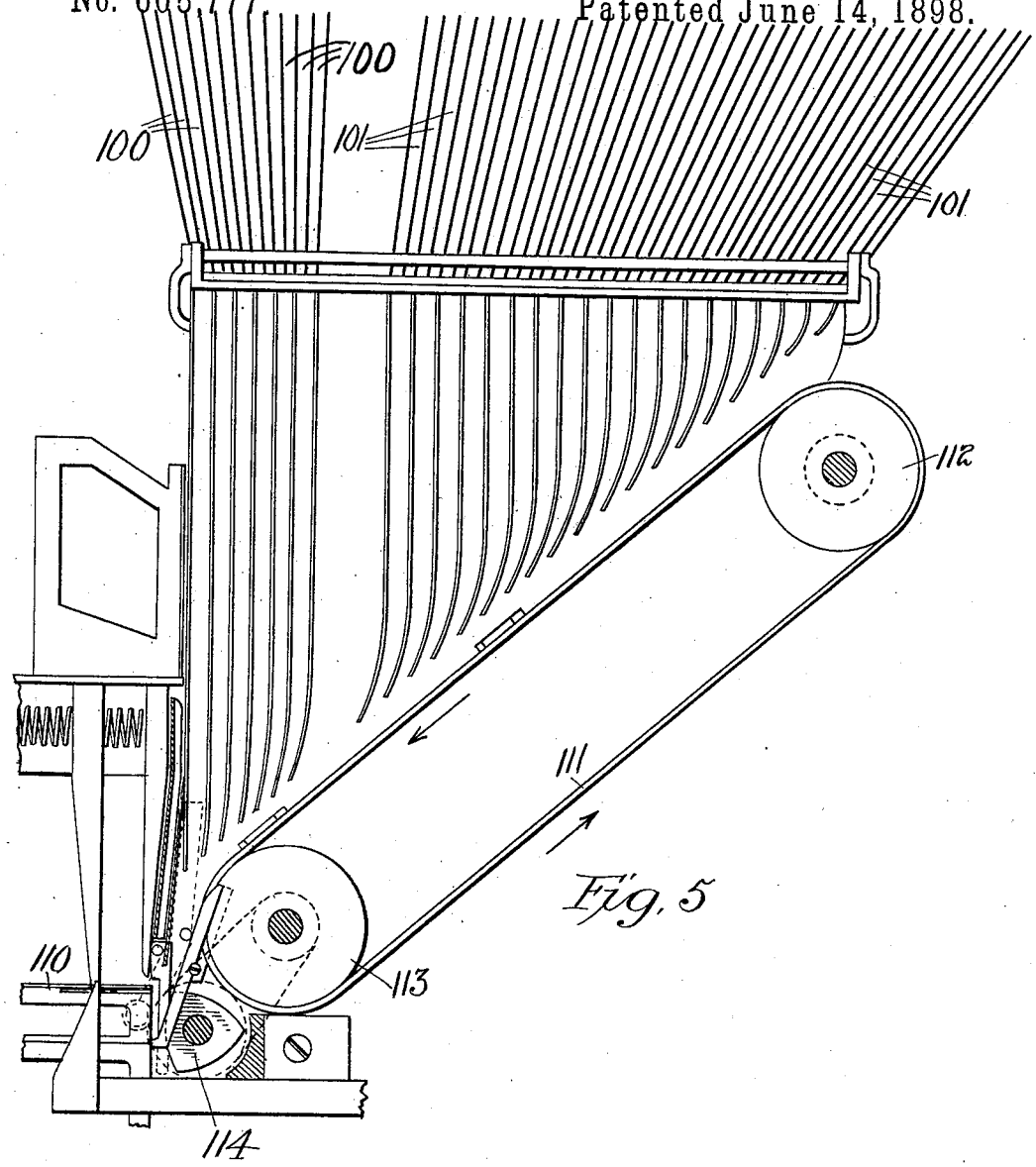

(No Model.)  9 Sheets—Sheet 6.
T. CAHILL.
LINOTYPE MACHINE, LINE CASTING MACHINE, AND MACHINE FOR MAKING TYPE BARS, LINOTYPES, AND MATRICES.
No. 605,777. Patented June 14, 1898.
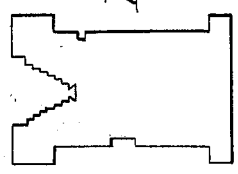
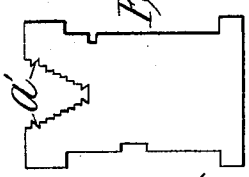
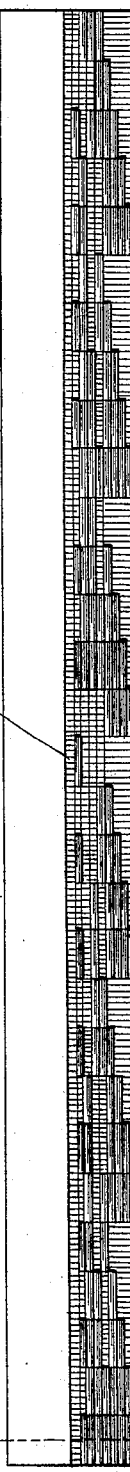
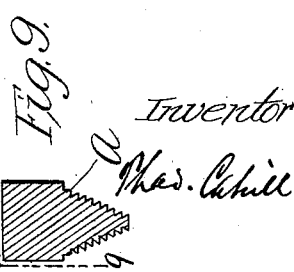

(No Model.) 9 Sheets—Sheet 7.

T. CAHILL.
LINOTYPE MACHINE, LINE CASTING MACHINE, AND MACHINE FOR MAKING TYPE BARS, LINOTYPES, AND MATRICES.

No. 605,777. Patented June 14, 1898.

Attest
Walter Donaldson
Arthur T. Cahill

Inventor
Thaddeus Cahill.

(No Model.)
T. CAHILL.
LINOTYPE MACHINE, LINE CASTING MACHINE, AND MACHINE FOR MAKING TYPE BARS, LINOTYPES, AND MATRICES.
No. 605,777. Patented June 14, 1898.
9 Sheets—Sheet 8.
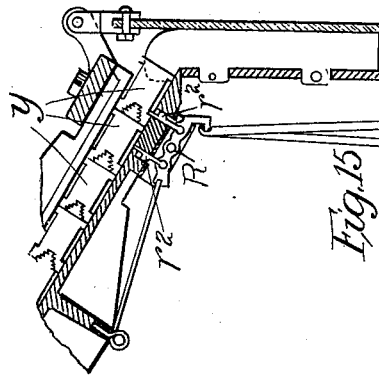
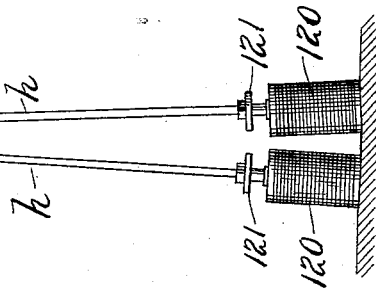
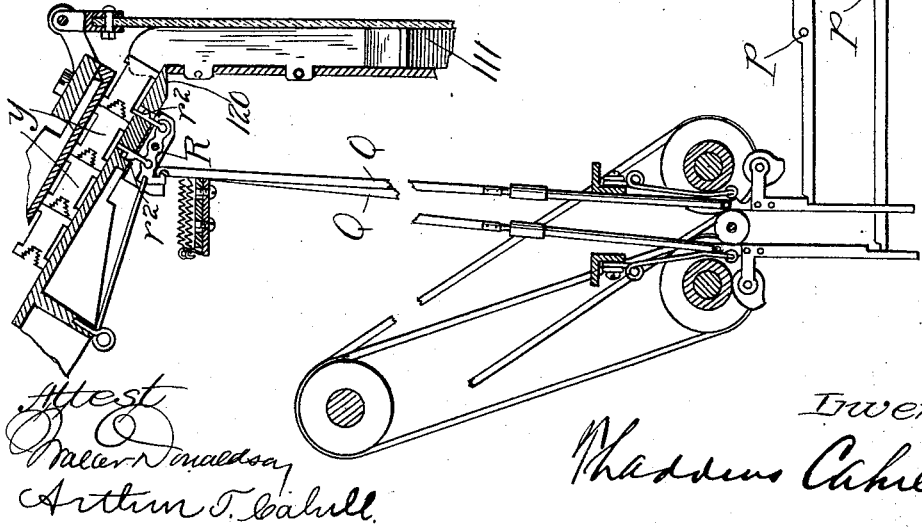

(No Model.) 9 Sheets—Sheet 9.

T. CAHILL.
LINOTYPE MACHINE, LINE CASTING MACHINE, AND MACHINE FOR MAKING TYPE BARS, LINOTYPES, AND MATRICES.

No. 605,777. Patented June 14, 1898.

UNITED STATES PATENT OFFICE.

THADDEUS CAHILL, OF NEW YORK, N. Y.

LINOTYPE-MACHINE, LINE-CASTING MACHINE, AND MACHINE FOR MAKING TYPE-BARS, LINOTYPES, AND MATRICES.

SPECIFICATION forming part of Letters Patent No. 605,777, dated June 14, 1898.

Original application filed October 21, 1896, Serial No. 609,489. Divided and this application filed August 11, 1897. Serial No. 647,862. (No model.)

*To all whom it may concern:*

Be it known that I, THADDEUS CAHILL, a citizen of the United States, and a resident of the city, county, and State of New York, temporarily residing at Washington, in the District of Columbia, have invented certain new and useful Improvements in Linotype-Machines, Line-Casting Machines, and Machines for Making Type-Bars, Linotypes, and Matrices, of which the following is a specification.

This application is a division of original application, Serial No. 609,489, filed October 21, 1896, which application issued on March 1, 1898, as Letters Patent No. 600,120. Much of the mechanism that is illustrated in this application is not claimed herein, being claimed in the Letters Patent aforesaid. This is particularly true of the permutational character-selecting mechanism hereinafter described, which is not claimed herein by itself alone, (being claimed in the Letters Patent aforesaid, No. 600,120, dated March 1, 1898,) but which, as it forms one of the elements of several of the combinations described and claimed herein, I have thought best to fully illustrate and describe herein.

My invention relates principally to means in a linotype-machine, type-casting machine, or other similar instrument whereby facility is afforded to the operator to select matrices two at a time instead of selecting them one at a time, as heretofore.

The form of machine best known and most generally used for making linotypes, type-bars, and matrices is the machine well known in the art and trade as the Mergenthaler linotype-machine. The most essential features of this machine are fully described in the patents to Mergenthaler, No. 317,828, dated May 12, 1885; Nos. 347,629 and 347,630, dated August 17, 1886, and Nos. 436,531 and 436,532, dated September 16, 1890, (to all which reference is hereby had and made for a full description of linotype-machines,) and in numerous other patents to Mergenthaler and others, all which are well known in the art.

The Mergenthaler machine (the essentials of which are described in the various patents to Mergenthaler above mentioned and in its developed form in the patent of September 16, 1890, above mentioned, No. 436,532, to which particular reference is hereby had and made) is well known to all persons skilled in the art, and I shall assume that the reader of this specification is familiar with its construction and operation, and I shall, for greater convenience, describe my invention as an improvement applied to said Mergenthaler machine, and will clearly illustrate and fully describe that part of the mechanism which is novel with myself and the manner in which that part of the mechanism which is new with me may be applied in connection with the devices invented by Mergenthaler and others and well known in the art, and will not burden this specification with a description of those parts of the machine which are old and well known.

The main object of my invention is to increase the speed of the machine, by which I mean to increase the amount of work which an average operator can do in a day or an hour upon the machine. To this end I provide the machine with two sets of keys, one for the right hand and the other for the left hand, and with two sets of matrices, one for each set of keys, and I arrange the whole in such a manner that when keys of the two sets are depressed simultaneously, each to make its own letter, the matrices controlled, respectively, by the keys depressed will be assembled or composed in proper order in the line. My invention then, it will be seen, relates to two sets of keys and to two sets of matrices and to means whereby when keys of the two sets are depressed simultaneously the matrices released, respectively, by them and belonging one to the one set and the other to the other set of matrices are assembled in proper order in the line, and my invention relates also, in part, to the distributing mechanism; but (*a*) the devices whereby the matrices are clamped, (*b*) the devices whereby the matrices are transferred from the assembling-block to the position they occupy in the machine when the slug or linotype is cast, (*c*) the mold-wheel, the pump, and, in a word, all the casting devices, (*d*) the devices whereby the slugs or linotypes are trimmed and assembled in proper order, (*e*) the space-bardelivery mechanism and the justifying devices, (f) the devices whereby the matrices are transferred, after the linotype or slug has been cast, from the position which they occupy during the operation of casting to their position on the distributing-rail, with other usual and well-known details of construction, need not be changed. The devices named in the last sentence preceding may be of the sort well known and commonly used in the Mergenthaler linotype-machine before mentioned. In its essential features the distributing mechanism which I use is that invented by Mergenthaler, described in the patents above enumerated, and universally known in the art; but in some of the features hereinafter described my distributing mechanism constitutes, with other elements, a novel combination.

The accompanying drawings fully illustrate my invention as applied to a Mergenthaler linotype-machine, with which linotype-machine, as before stated, it will be assumed that the reader, in common with all other persons skilled in the art, is conversant, and full descriptions of which may be found in the patents hereinbefore enumerated, and particularly in that of September 16, 1890, No. 436,532.

Figure 2:
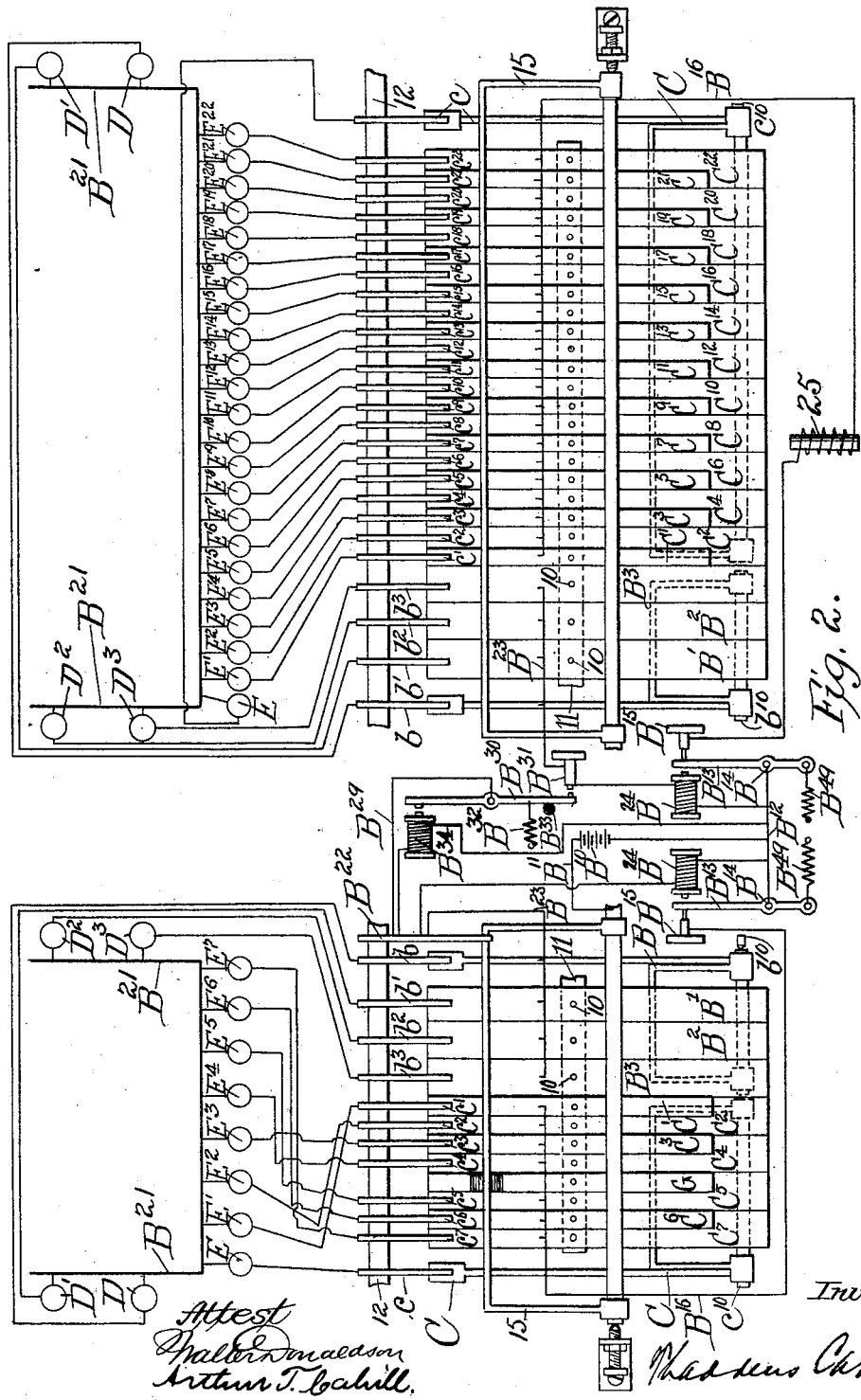
Figure 3:
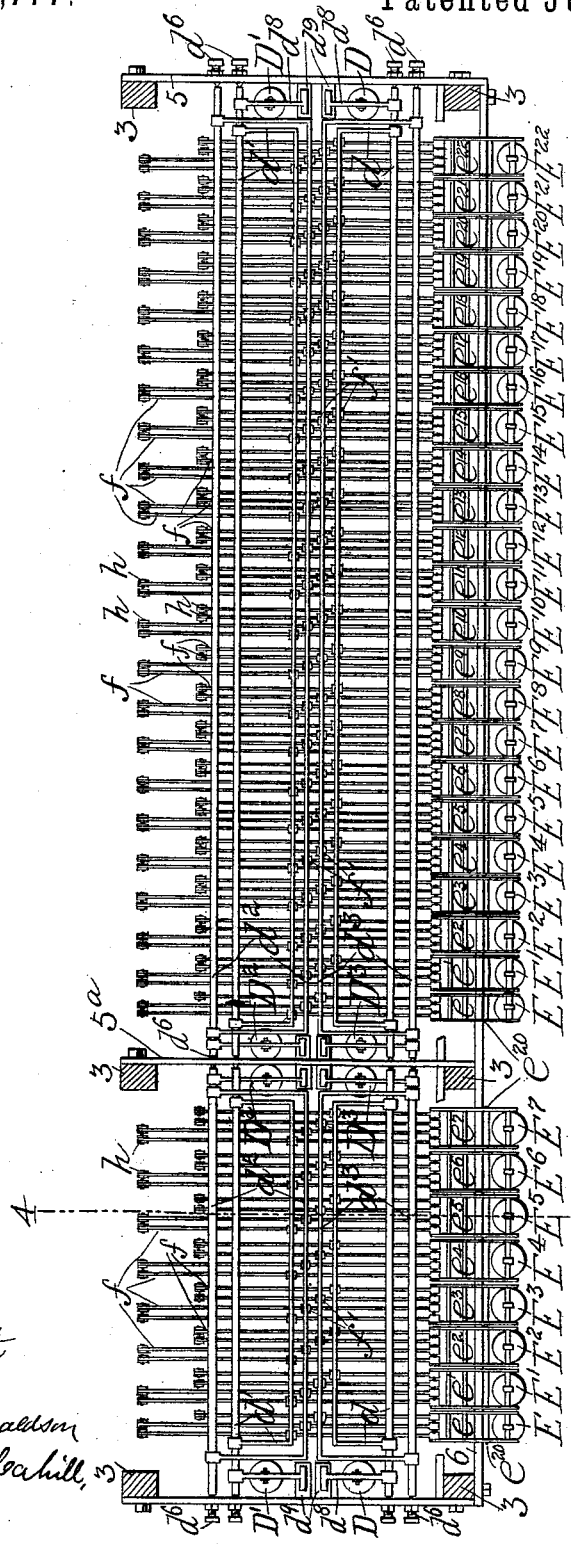
Figure 4:
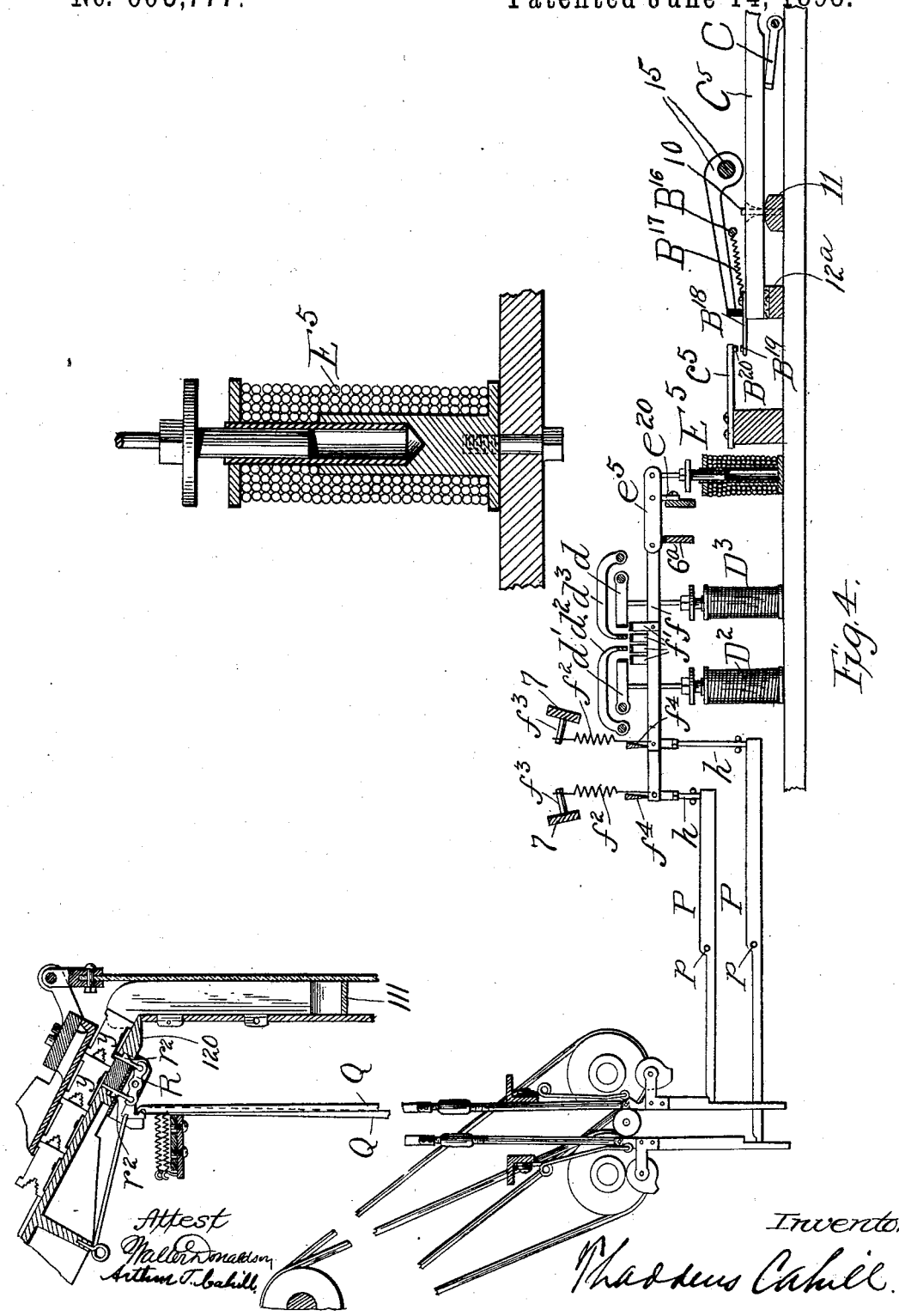
Figure 12:
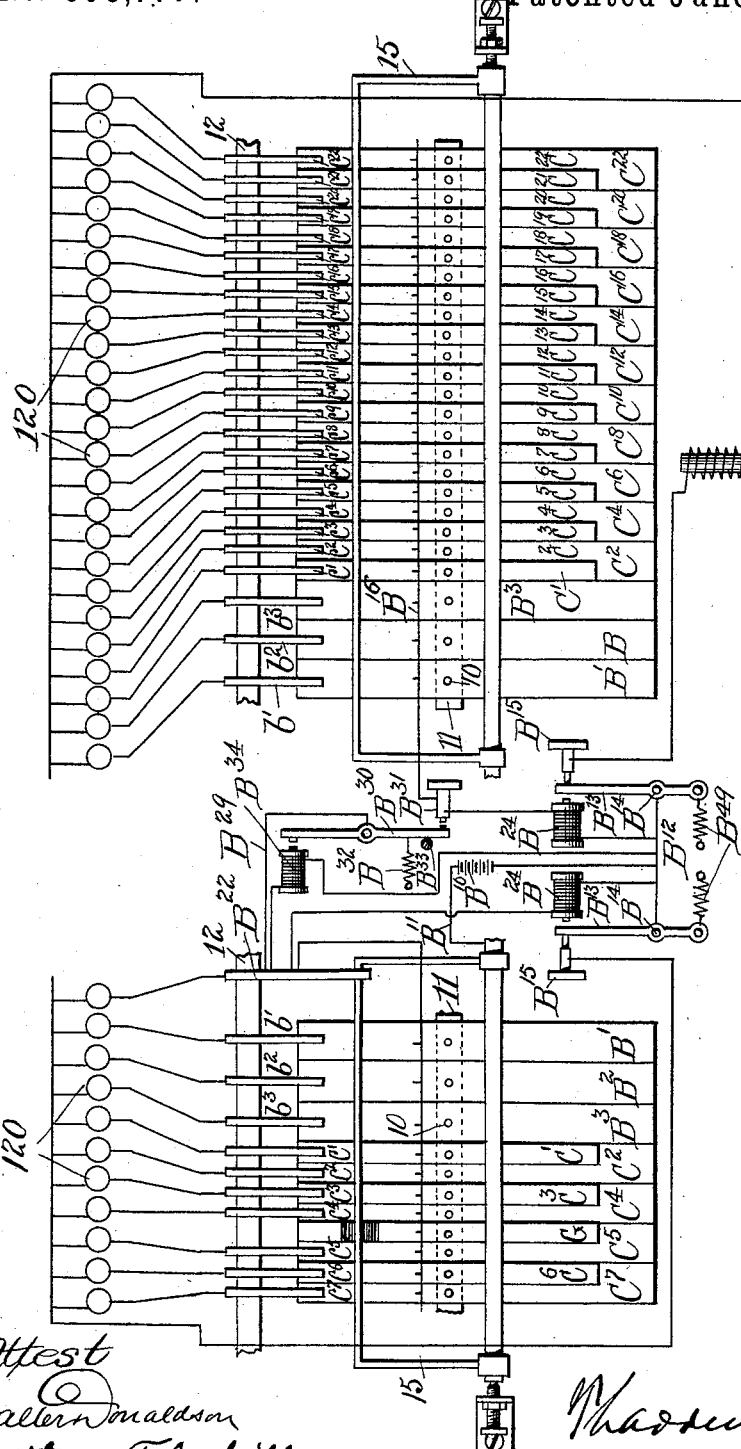
Figure 14:
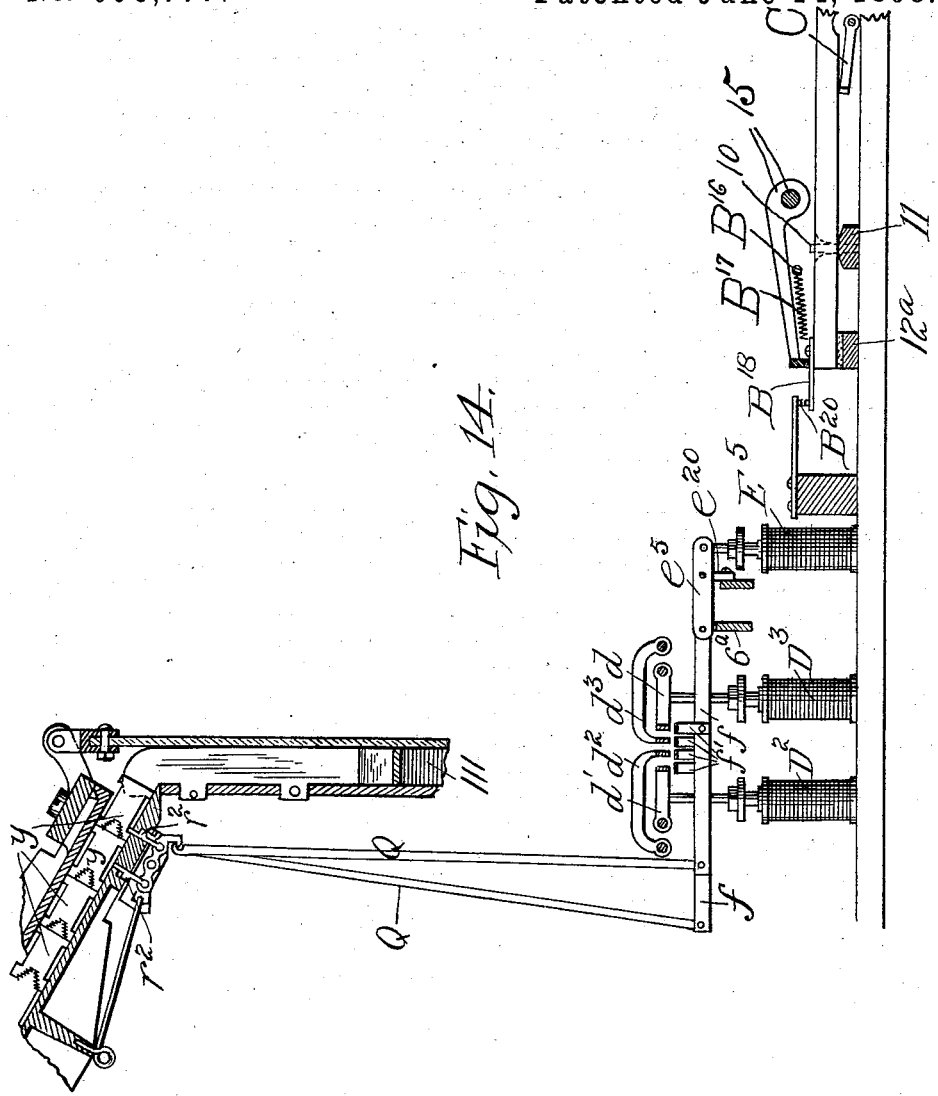

In the drawings, Figure 1 is a front elevation illustrating the upper portion of a Mergenthaler linotype-machine with my invention applied thereto. Fig. 2 is a diagrammatic plan view illustrating the keys and electrical connections. Fig. 3 is a detail, a plan view, illustrating the permutational character-selecting devices which are controlled by the keys illustrated in the preceding figure and which serve to operate the matrix-controlling escapements of the machine. Fig. 4 is a detail, a sectional elevation on the line 4 4 in the preceding figure, illustrating the permutational character-selecting mechanism which is controlled by the keys connected to operate the matrix-controlling escapements, one escapement device only being shown in the figure. Fig. 5 is a detail elevation illustrating a portion of the composing mechanism by which the matrices, after they have been released by the matrix-controlling escapements, are conveyed in proper order to the assembling-block. Figs. 6 and 7 are side elevations illustrating consecutive portions of the distributing-rail, Fig. 6 showing that portion of said rail which serves to distribute the matrices of the primary-position or quick-acting set, and Fig. 7 illustrating that portion of said rail that serves to distribute the matrices of the secondary-position or slow-acting set that correspond to the matrices of the primary-position set. Fig. 8 is a cross-section on the line 8 8, Fig. 6. Fig. 9 is a cross-section on the line 9 9, Fig. 7. Figs. 10 and 11 illustrate two matrices both corresponding to the same character and belonging one to the primary-position or quick-acting set of matrices and the other to the secondary-position or slow-acting set of matrices. Fig. 10 illustrates the matrix belonging to the quick-acting set of matrices and Fig. 11 that belonging to the slow-acting set of matrices. Figs. 12 and 13, which are views corresponding, respectively, to Figs. 2 and 4, illustrate non-permutational electrical connections between the keys and the releasing devices whereby the matrices are freed, a separate key and a separate electromagnet being used for each releasing device in place of the smaller number of keys and electromagnets constituting the permutational character-selecting mechanism illustrated in Figs. 2, 3, and 4. Fig. 14 is a view similar to Fig. 4, but illustrating a more direct connection between the character-corresponding levers $ff$ of the permutational character-selecting mechanism and the releasing devices whereby the matrices are freed; and Fig. 15 is a view similar to Fig. 13, but illustrating a more direct connection between the electromagnets and the releasing devices than is shown in Fig. 13.

*Of the two sets of matrices.*—I have said that I employ two sets of matrices controlled by two sets of keys and that the whole mechanism is constructed and arranged in such a manner that when keys of the two sets are acted upon simultaneously, each to release the proper matrix of the set which it controls, the two matrices are brought into proper order in the assembled line of matrices. In the drawings the magazine-tubes serving for the one set of matrices (the quick-acting set) are marked 100, while the magazine-tubes serving for the other set of matrices (the slow-acting set) are marked 101. Several forms of matrices and of magazine-tubes or other matrix-storing devices are well known in the art, so that I need not describe any special form. I prefer, as before said, to copy the mechanism invented by Mergenthaler and well known in the art, (and described in the patents hereinbefore referred to, particularly that of September 16, 1890, No. 436,532,) but other known or equivalent forms of mechanism may be used instead, and I do not limit myself to that of Mergenthaler. I prefer, in applying my invention to a Mergenthaler machine, to make one set of matrices (and preferably the slow-acting set) complete with upper-case and lower-case alphabets of matrices and with matrices corresponding to the usual numerals, punctuation-marks, and signs—say about ninety different sorts or groups of matrices in all—and to make the other set of matrices (preferably the quick-acting set of matrices) with a very much smaller number of different sorts of matrices or characters—say with matrices for the letters of the alphabet, lower case, and with matrices for a few of the more-frequently-occurring marks of punctuation, such as the period, comma, semicolon, apostrophe, and hyphen. The number of matrices in each set, however, may be made great or small, as required. Each set of matrices, as before said, when applied to a Mergenthaler machine, (the kind of machine to which I shall describe my invention as applied, without, however, at all limiting myself to applying my invention to such machines only,) consists of a number of different groups of matrices, the different matrices of a group being essentially alike and the different groups representing different letters or other characters, each group of matrices having a magazine-tube or other matrix-containing chamber of its own, to which the matrices are delivered by the distributing mechanism and from which they are released, as required, by the matrix-controlling escapement devices, of which there is one for each magazine-tube.

I have said that the whole mechanism is constructed and arranged in such a manner that when keys of the two sets are acted upon simultaneously, each to release the proper matrix of the set that it controls, the two matrices thus released are brought into proper order in the assembled line of matrices, and I sometimes speak in this specification of the quick-acting set of matrices and sometimes of the slow-acting set of matrices, or of a quick-acting set of matrices and a slow-acting set of matrices. By the "quick-acting set of matrices" I mean that set of matrices from which when the operator makes two letters simultaneously the matrix which is to stand first of the two in the assembled line of matrices is taken, and by the "slow-acting set of matrices" I mean that set of matrices from which when the operator makes two letters simultaneously the matrix which is to stand second of the two in the assembled line of matrices is taken. It will of course be understood that when the operator depresses keys of the two sets simultaneously, thereby to release two matrices, one corresponding to one character and the other corresponding to the next following character, the two matrices thus released must be made to stand in proper order in the assembled line of matrices. Thus, to illustrate, if the operator wishes to make the word "on," striking the "o" key of the quick-acting set of keys and the "n" key of the slow-acting set of keys at the same instant, it is essential that the "o" matrix be made to stand in the assembled line of matrices to the left or in front of the "n" matrix and that the "n" matrix follow the "o" matrix. On the other hand, if the operator wishes to make the word "no," striking the "n" key of the quick-acting set and the "o" key of the slow-acting set of keys at the same instant, it is essential that the "n" matrix should be made to stand in the assembled line of matrices to the left or in front of the "o" matrix and that the "o" matrix should be made to follow the "n" matrix in the assembled line of matrices. I prefer to use two means to insure this result. One means for this purpose, which will be described more at length hereinafter, is to connect the keys of the "quick-acting set" (a term which will be hereinafter defined) with the set of matrices controlled thereby through quick-acting connections, so that so soon as the key is touched the corresponding matrix-controlling escapement acts to release a matrix, and to connect the keys of the "slow-acting set" (a term which will be explained hereinafter) with the set of matrices controlled thereby through slow-acting connections, so that when keys of the two sets are depressed simultaneously, each to free the proper matrix of the corresponding set, the matrix-controlling escapement affected by the key or keys depressed of the slow-acting set cannot act until the matrix-controlling escapement affected by the key or keys depressed of the quick-acting set has first acted.

(b) Another means that I employ to insure that matrices of the one set (herein termed the "quick-acting set") shall when keys of the two sets are depressed at exactly the same instant be made to stand in the line of assembled matrices—to the left or in front of a matrix of the other or slow-acting set—is to dispose the matrices of the quick-acting set in proximity to the assembling-block, so that when released by their escapements they quickly reach the assembling-block, and to make the matrices of the slow-acting set stand normally more remote from the assembling-block than the matrices of the quick-acting set, so that if two matrices, one belonging to the quick-acting set and the other belonging to the slow-acting set, be simultaneously released the matrix belonging to the quick-acting set will reach the assembling-block in advance of the matrix belonging to the slow-acting set, and the two matrices be set in proper order in the line of assembled matrices. A convenient arrangement for this purpose is to dispose the magazine-tubes containing the quick-acting set of matrics to the left of the magazine-tubes containing the slow-acting set of matrices and in proximity to the assembling-block, the magazine-tubes containing the slow-acting set of matrices being of course disposed to the right of the magazine-tubes containing the quick-acting set of matrices and more remote from the assembling-block than the quick-acting set of matrices. The construction is illustrated in Figs. 1 and 5, in which the magazine-tubes 100, which contain the matrices of the quick-acting set, lie to the left near the assembling-block 110, while the magazine-tubes 101, which contain the matrices of the slow-acting set, lie to the right of the quick-acting set of matrices and more remote from the assembling-block 110. I thus insure that when the operator depresses at the same instant two keys belonging one to the one set of keys and the other to the other set of keys, thereby to produce two consecutive letters, (that is, to bring two matrices corresponding to the two letters required to the assembling-block,) the two matrices shall stand in proper consecutive order in the line of matrices being assembled.

Except in respect of the notches with which the matrices are furnished to engage the distributing-rail (a matter which will be gone into fully hereinafter) two matrices corresponding to the same character, but belonging one to the quick-acting set of matrices and the other to the slow-acting set of matrices, may be in every way exactly alike.

*Of the two sets of keys.*—It has been said that there are two sets of keys controlling the two sets of matrices, the two sets of keys being adapted to be operated simultaneously by the operator for the making of two letters at the same time—one letter from each set of keys. The two sets of keys have a general similarity; but as I prefer to make one set of matrices complete with upper and lower case alphabets, figures, marks, and other necessary characters, while making the other set of matrices to have only the lower-case letters, with a few frequently-occurring marks of punctuation, (a feature of my construction which may be varied from, if desired,) there is of course a corresponding difference in the two sets of keys. That set of keys which controls the matrices which are adapted (when keys of the two sets are depressed simultaneously to release a matrix from each set) to stand first of the two in the line of matrices being assembled is called the "quick-acting set of keys," or more shortly the "quick-acting keys," while that set of keys which controls the matrices that are adapted (when keys of the two sets are depressed at the same instant to release a matrix of each set) to stand second in the line of matrices being assembled—that is, to follow in due order in the line the other of the two letters thus simultaneously produced by the operator—is called the "slow-acting set of keys."

I shall first describe the keys of the quick-acting set, which stand in Fig. 2 to the left of the keys of the slow-acting set. The quick-acting set of keys consists of (*a*) three keys, (marked, respectively, B', B², and B³) which, with a frame B, controlled by said keys B', B², and B³, control four frames $d$, $d'$, $d^2$, and $d^3$, Figs. 3 and 4, hereinafter described, belonging to the permutational devices proper to such keys; (*b*) seven keys C', C², C³, C⁴, C⁵, C⁶, and C⁷, which, with a frame C, controlled by said keys, control the eight frames $e$, $e'$, $e^2$, $e^3$, $e^4$, $e^5$, $e^6$, and $e^7$, Figs. 3 and 4, hereinafter described, that coact with the four frames $d$, $d'$, $d^2$, and $d^3$ before mentioned in selecting characters, as hereinafter described, and (*c*) a space-key G. For convenience sake the keys B', B², and B³ will sometimes be termed hereinafter the B-group keys, or the keys of the B group, and the keys C', C², C³, C⁴, C⁵, C⁶, and C⁷ will sometimes be termed hereinafter the keys of the C group, or the C-group keys. The keys are preferably arranged somewhat like those of a pianoforte, as illustrated in the drawings. They may be centered by means of pins 10 10, driven into a fulcrum-bar 11, as in a pianoforte, or they may be fulcrumed in any other suitable manner whatever. The rear ends of the keys rest normally down upon a felted bar 12ª, Fig. 4. The frames B and C and the electrical connections will be described after the essential parts of the selecting device have been described.

The slow-acting set of keys, as figured in the drawings, differs from the quick-acting set only in having a greater number of C-group keys. In Fig. 2 there are twenty-two C-group keys, (marked, respectively, C' to C³²,) which with the frame C underlying said keys control the twenty-three frames $e$ $e'$ $e^2$ $e^3$ $e^4$, &c., belonging to the permutational character-selecting device that serves for the slow-acting keys. The electrical connections will be described hereinafter.

*Of the permutational character-selecting devices.*—The function of the permutational character-selecting devices is to enable the operator to make a large number of letters by acting upon a small number of keys. There are two such selecting devices—one for the left-hand or quick-acting set of keys and the other for the right-hand or slow-acting set of keys. The two character-selecting devices are similar in essential features; but as the character-selecting devices of the right-hand or slow-acting keys control a much larger number of matrix-controlling escapement devices it contains a much larger number of elements.

I shall first describe the character-selecting devices belonging to the left-hand or quick-acting set of keys and will then describe briefly the difference between such selecting device and the selecting device serving for the right-hand or slow-acting set of keys. (See particularly Figs. 3 and 4.) $d'$, $d^2$, $d^3$, and $d$ are frames corresponding, respectively, to the three keys B' B² B³ and the frame B. Said frames, as illustrated in the drawings, consist each of a center rod or shaft and a bent side and end portion firmly attached to the center rod. The center rod is fulcrumed by means of pointed screws $d^5$ $d^5$, set in the side bar 5, and points $d^6$, set in the center bar 5ª. $e'$, $e^2$, $e^3$, $e^4$, $e^5$, $e^6$, $e^7$, and $e$ are other frames or levers corresponding, respectively, to the keys C' C² C³ C⁴ C⁵ C⁶ C⁷ and the frame C. The frames $d'$, $d^2$, $d^3$, and $d$ are each operated by electromagnets D', D², D³, and D, hereinafter described, controlled, respectively, by the keys B' B² B³ and the frame B. In like manner the other frames or levers $e'$, $e^2$, $e^3$, $e^4$, $e^5$, $e^6$, $e^7$, and $e$ are operated by other electromagnets E', E², E³, E⁴, E⁵, E⁶, E⁷, and E, controlled, respectively, by the keys C' C² C³ C⁴ C⁵ C⁶ C⁷ and the frame C.

$f f f f$ are levers corresponding to the matrices (or to the matrix-controlling escapements) of the set which they control, and said levers $f f f$ are connected each by a push-down wire $h$, Fig. 4, attached to one end of said lever $f$, with the corresponding lever P, (centered at $p$,) which serves to operate the matrix-controlling escapement device R $r'$ $r^2$. The other end of each of said levers $f f f$—that is to say, the end of said lever remote from the end to which the push-down wire $h$ is connected—is pin-jointed to one of the frames $e, e', e^2, e^3, e^4, e^5, e^6$, or $e^7$, four of said levers $fff$ being pin-jointed to each of said frames $e', e^2, e^3, e^4, e^5, e^6$, and $e^7$ and three to the frame $e$. The frames $d, d', d^2$, and $d^3$ overlie the levers $fff$ intermediate the points at which said levers are connected (a) with the frames $e, e', e^2, e^3, e^4, e^5, e^6$, or $e^7$, as the case may be, and (b) with the push-down wires $h\ h$, by which said levers are connected, it will be remembered, with the escapement-controlling levers P P. Said levers $fff$ are operated each by the conjoint action of some one of the frames $d, d', d^2$, and $d^3$ corresponding to the B-group keys and some one of the frames $e, e', e^2, e^3, e^4, e^5, e^6$, and $e^7$ corresponding to the C-group keys, and each different lever $f$ is operated by a different combination of the frames above mentioned, and every different combination of two frames belonging one to the group of frames $d, d', d^2$, and $d^3$ (corresponding to the B-group keys) and the other to the group of frames $e, e', e^2, e^3, e^4, e^5, e^6$, and $e^7$ (corresponding to the C-group keys) operates a different one of the levers $ff$ and thereby a different matrix-controlling escapement device R $r'\ r^2$.

Each of the frames $d, d', d^2$, and $d^3$ affects one of the levers $fff$ connected with each of the frames $e, e', e^2, e^3, e^4, e^5, e^6$, and $e^7$, (except that the frame $d$, for reasons which will appear hereinafter, does not affect any of the levers $fff$ connected with the frame $e$,) and in each group of levers $fff$ belonging to one of the frames $e\ e'\ e^2$, &c., each of the frames $d, d', d^2$, and $d^3$ affects a different lever $f$ from what any other one of said frames affects. To this end a projection $f'$ is attached to each of the levers $ff$, &c., immediately underneath that one of the frames $d, d', d^2$, or $d^3$ which is designed to operate the particular lever $f$ to which such projection is attached. The top surfaces of said projections $f'\ f'$ stand above the top surfaces of the levers $ff$ a distance somewhat greater than the maximum movement of the levers $ff$ or of the frames $d, d', d^2$, and $d^3$ at that point, so that any particular lever in one of the groups of levers $ff$ carried by one of the frames $e, e'\ e^2, e^3, e^4, e^5, e^6$, and $e^7$ can coact with the corresponding frame $d, d', d^2$, or $d^3$, as the case may be, without affecting or being affected by any other one of said frames $d\ d'\ d^2\ d^3$.

In my preferred construction the frames $d, d'\ d^2$, and $d^3$ lie normally with their lower surfaces in close proximity to the upper surfaces of the projections $f'\ f'$, attached to the levers $ff$.

Contractile springs $f^2\ f^2$, which are attached at one end to the levers $f\ f$ at the points at which said levers are connected with the push-down wires $h\ h$ and at the other end to pins $f^3\ f^3$, driven into the bars 7 7, serve to pull upwardly upon each of the levers $ff$ with a force greater than is required to lift one of the frames $d\ d'\ d^2\ d^3$ and to hold the front ends of the levers $ff$ normally in contact with the rails $f^4\ f^4$. When, therefore, any of the frames $e, e', e^2, e^3, e^4, e^5, e^6$, and $e^7$ is tilted by the action of the magnets E E' E², &c., controlling it, so that the end of said frame connected with the levers $ff$ is raised, each of said levers $ff$ connected with the frame that is tilted will move upon its point of bearing on the lower surface of the rail $f^4$ as a fulcrum and will raise that one of the frames $d, d', d^2$, or $d^3$ which lies over it (supposing said frame to be not held down by the action of the corresponding magnet D, D', D², or D³, as the case may be) without at all affecting the push-down wires $h\ h$ or the levers P P and matrix-controlling escapements R $r'\ r^2$ (of which one only is shown in the drawings) with which said push-down wires connect said levers $ff$; but if when any of said frames $e\ e'\ e^2$, &c., is tilted in the manner above described any one of the frames $d, d', d^2$, or $d^3$ be held at rest (by the action of the appropriate magnet D, D', D², or D³ or in any other suitable manner) such frame so held at rest will give a fulcrum to that one of the levers $ff$ lying under it which is raised by the frame $e, e', e^2, e^3, e^4, e^5, e^6$, or $e^7$ that is tilted, and said lever $f$ will move upon its point of bearing on said frame $d, d', d^2$, or $d^3$, as the case may be, so held at rest as a fulcrum, and the end of said lever $f$ connected with the push-down wire $h$ will move down, thus through the push-down wire $h$ and lever P throwing up the rod Q controlling the corresponding escapement R $r'\ r^2$, thereby releasing the required matrix $y$; but the other three frames of the set of frames $d, d', d^2$, and $d^3$ which are not held down will be raised by the levers $fff$ underlying them, and the typebars corresponding to such levers $fff$ will be in no wise affected. Thus it will be seen each of the frames $e', e^2, e^3, e^4, e^5, e^6$, and $e^7$ serves for the making of four different letters—that is, for the operating of four escapement devices, each controlling a different group of matrices—one by the coacting of the frame $d$ when said frame is held at rest, one by the coacting of the frame $d'$ when said frame is held at rest, another by the coacting of the frame $d^2$ when said frame is held at rest, and a fourth character by the coacting of the frame $d^3$ when said frame is held at rest; but the frame $e$ serves for the making of three characters only—to wit, one by the coacting of the frame $d'$, another by the coacting of the frame $d^2$, and a third by the coacting of the frame $d^3$. In other words, the frame $e$, unlike the frames $e', e^2, e^3, e^4, e^5, e^6$, and $e^7$, and for reasons which will clearly appear hereinafter, has no lever $f$ adapted to coact with the frame $d$.

In the preferred construction illustrated in the drawings electromagnets D', D², D³, and D are connected with the frames $d', d^2, d^3$, and $d$, respectively, and controlled by the keys B' B² B³ and the frame B, respectively, serve to hold said frames at rest, each as required, with the magnet-connected arm $d^8$ held fast down upon the stop $d^9$, so that the frame thus held at rest, affords an effective fulcrum to the lever $f$ in moving the corresponding matrix-controlling lever P, and the electromagnets E', $E^2$, $E^3$, $E^4$, $E^5$, $E^6$, $E^7$, and E (controlled, respectively, by the keys C', $C^2$, $C^3$, $C^4$, $C^5$, $C^6$, $C^7$, and the frame C) are connected, respectively, with and serve to operate the frames $e'$, $e^2$, $e^3$, $e^4$, $e^5$, $e^6$, $e^7$, and $e$; but very obviously said frames $d$, $d'$, $d^2$, and $d^3$ and $e$, $e'$, $e^2$, $e^3$, $e^4$, $e^5$, $e^6$, and $e^7$ might be operated in other ways than by means of electromagnets. (See on this point the Letters Patent to me before mentioned, No. 600,120, dated March 1, 1898, and also No. 604,001, dated May 10, 1898.)

I prefer, as before said, to have the frames $d$, $d'$, $d^2$, and $d^3$ lie in their normal positions, with their lower faces in close proximity to the upper surfaces of the projections $f'$ $f'$, attached to the levers $f$ $f$, so that when any one of said frames $d$, $d'$, $d^2$, and $d^3$ is held down it furnishes an effective fulcrum for the lever $f$ underlying it, raised by the action of the proper frame $e$ $e'$ $e^2$, &c., and so that such of said frames $d$, $d'$, $d^2$, and $d^3$ as are not held down are lifted by the raising of those levers $f$ $f$ $f$ lying underneath them which are raised by the action of that one of the frames $e$ $e'$ $e^2$, &c., that acts to make a letter; but instead of employing this arrangement the frames $d$, $d'$, $d^2$, and $d^3$ may be made to lie each normally with its lower surface above the top surfaces of the projections $f'$ $f'$ a distance as great as or slightly greater than the distance which such projections $f'$ $f'$ are lifted by the tilting of the frames $e$ $e'$ $e^2$, &c., and each of the frames $d$, $d'$, $d^2$, and $d^3$, when it acts for the making of a letter, may be pulled down from such its normal position either by an electromagnet, as illustrated in the drawings, or in any other suitable manner, so that it will press down upon the lever $f$ to be operated in the middle at the same time that said lever $f$ is raised at one end by the action of the corresponding frame $e$ $e'$ $e^2$, &c., as the case may be, all as described in the Letters Patent aforesaid, No. 600,120, dated March 1, 1898.

It has now been made clear that each different combination of two frames belonging one to the group of frames $d$, $d'$, $d^2$, and $d^3$ and the other to the group of frames $e$, $e'$, $e^2$, $e^3$, $e^4$, $e^5$, $e^6$, and $e^7$ actuates a different one of the character-corresponding levers $f$ $f$ $f$ and a different one of the matrix-controlling escapement devices R $r'$ $r^2$, thereby freeing a different matrix. This statement, however, is to be taken subject to the exception that the frames $d$ and $e$, for reasons which will clearly appear hereinafter, are not adapted to act together in releasing a matrix, the frame $e$ carrying but three of the levers $f$ $f$ $f$, which serve for the frames $d'$, $d^2$, and $d^3$, respectively, no lever $f$ being furnished by the frame $e$ for the frame $d$ to act upon.

The permutational character-selecting device controlled by the keys of the slow-acting set (see Figs. 2 and 3) differs from the permutational character-selecting device already described controlled by the keys of the quick-acting set only in that the permutational character-selecting device controlled by the keys of the slow-acting set has a larger number of character-corresponding levers $f$ $f$ and of the frames $e$ $e'$ $e^2$ $e^3$ $e^4$, &c., and magnets E E' $E^2$ $E^3$ $E^4$, &c., controlling them.

In place of the eight frames $e'$, $e^2$, $e^3$, $e^4$, $e^5$, $e^6$, $e^7$, and $e$ of the quick-acting set controlled by the keys C' $C^2$ $C^3$ $C^4$ $C^5$ $C^6$ $C^7$ and the frame C the permutational character-selecting device controlled by the slow-acting keys has twenty-three frames $e$ $e^2$ $e^3$ $e^4$, &c., controlled by the electromagnets E E' $E^2$ $E^3$ $E^4$, &c., and through such magnets by the frame C and the keys C' $C^2$ $C^3$ $C^4$, &c., respectively.

It remains to describe the mechanism by which the keys control the frames $d$, $d'$, $d^2$, and $d^3$ and $e$, $e'$, $e^2$, $e^3$, $e^4$, $e^5$, $e^6$, and $e^7$. I shall first describe the arrangement of the left-hand keys with their electrical connections, after which the arrangement of the right-hand keys and connections, being in most respects similar to that of the left-hand keys, will be easily explained.

*Of the electrical connections.*—Electromagnets D, D', $D^2$, and $D^3$, as before said, control the frames $d$, $d'$, $d^2$, and $d^3$, respectively, and other electromagnets E, E', $E^2$, $E^3$, $E^4$, $E^5$, $E^6$, and $E^7$, respectively, as before said, serve to control the frames $e$, $e'$, $e^2$, $e^3$, $e^4$, $e^5$, $e^6$, and $e^7$, respectively. The construction of these magnets is fully illustrated in the drawings and will be referred to hereinafter; but it is sufficient for our present purposes to call attention to the fact that each consists, essentially, of (A) a fixed core screwed fast to the bed-plate or bottom of the key framing, (B) a movable armature connected to the frame to which such magnet corresponds and which it serves to actuate, and (C) an energizing coil or solenoid wound about both the fixed core and the movable armature. When a current is passed through said energizing-coil, the inclosed core and armature become magnetized and attract each other. The effect of energizing one of the magnets D D' $D^2$ $D^3$ is to cause said magnet to pull down upon the corresponding frame $d$, $d'$, $d^2$, or $d^3$, and the effect of energizing one of the magnets E, E', $E^2$, $E^3$, $E^4$, $E^5$, $E^6$, or $E^7$ is to cause such magnet to pull down upon that end of the frame $e$, $e'$, $e^2$, $e^3$, $e^4$, $e^5$, $e^6$, or $e^7$ with which said magnet is connected, thereby elevating the other end of said frame and the ends of the character-corresponding levers $f$ $f$ $f$ $f$, pin-jointed thereto. The keys control the magnets before mentioned, closing their circuits.

A separate key might obviously be employed for each of the magnets D, D', $D^2$, and $D^3$ and another separate key for each of the magnets E, E', $E^2$, $E^3$, $E^4$, $E^5$, $E^6$, and $E^7$, in which case no letter could be made except by the simultaneous depressing of two keys, for no key acting singly would effect the release of a matrix. I have, however, contrived things in such a manner that a number of the most frequently-occurring letters of the alphabet (ten with the construction illustrated in the drawings, constituting about seventy-six per cent. of running letters) can be made by the action of a single key each, the other characters being produced by the simultaneous depressing of two keys. I employ in the construction figured in the drawings ($a$) three keys B', B², and B³, which serve to close the circuits, respectively, of the magnets D', D², and D³; ($b$) seven keys C', C², C³, C⁴, C⁵, C⁶, and C⁷, which serve to close the circuits, respectively, of the magnets E', E², E³, E⁴, E⁵, E⁶, and E⁷; ($c$) a frame B, lying underneath the keys B', B², and B³, which serves to close the circuit of the magnet D when any of the keys C', C², C³, C⁴, C⁵, C⁶, or C⁷ is depressed and when no one of the keys B' B² B³ is depressed, which frame is acted on by any of the keys B', B², and B³ when depressed, so that it breaks the circuit of its magnet D about the instant that the key B', B², or B³ depressed closes the circuit of the magnet D', D², or D³ corresponding to it, and ($d$) I employ a frame C, lying underneath the keys C', C², C³, C⁴, C⁵, C⁶, and C⁷, which serves to close the circuit of the magnet E, controlling the frame $e$, when any one of the keys B', B², or B³ is depressed and when no one of the keys C, C', C², C³, C⁴, C⁵, C⁶, or C⁷ is depressed, which frame is acted upon by any of the keys C', C², C³, C⁴, C⁵, C⁶, and C⁷ when depressed, so that it breaks the circuit of its magnet E about the instant that the key C', C², C³, C⁴, C⁵, C⁶, or C⁷ depressed closes the circuit of the magnet corresponding to it. There is also a space-key G, as before mentioned, and a rocking frame 15, the central part of which is broken away in Figs. 2 and 12. Said frame lies across all the keys, both those of the left-hand set and those of the right-hand set, and serves when raised by the depressing of any key (except the space-key G, which does not affect said frame, being recessed into or cut out at the point where said frame crosses it sufficiently to execute its ordinary movement without coming into contact with said frame) to close the otherwise-open battery-circuit; and by "depressing a key," it may be well to say here, I mean the pressing down of the front end of it by the operator, which of course causes the rear part of the key which the frame 15 overlies to rise, thereby raising said frame 15.

It remains to describe the arrangement of the electrical circuits. I shall first describe the arrangement of the circuits controlled by the left-hand or quick-acting set of keys. (See Fig. 2.) B¹⁰ is a battery or other suitable source of electric current, one pole of which is connected by a wire B¹¹ with the metal shaft of the metal rocking frame 15, before mentioned. The other pole of said battery is connected through the wire B¹² with the contact-lever B¹³, which is centered at B¹⁴, and through said lever B¹³ with the adjustable contact-screw B¹⁵. Said adjustable contact-screw is connected by a wire B¹⁶ with each and all of the keys C', C², C³, C⁴, C⁵, C⁶, and C⁷ and with the frame C. The connection between said wire B¹⁶ and said keys and frame may be made in any of the many ways well known to electricians. A convenient arrangement is illustrated in Fig. 4, in which a flexible wire B¹⁷ leads from the principal wire B¹⁶ to a contact-piece B¹⁸, screwed fast to the rear end of the key and carrying a platinum point B¹⁹, adapted to make and break connection with a corresponding platinum point B²⁰, carried by the contact-spring $c'$ $c^2$ $c^3$, &c., with which the key makes and breaks connection. These details—to wit, the flexible wire B¹⁷ and the contact-piece B¹⁸, screwed to the rear end of the key, with the platinum points B¹⁹ and B²⁰—are omitted in the diagrammatic view, Fig. 2, in which the key for greater clearness and convenience of representation is supposed to be (as it might well enough be if it were made of metal) itself connected with the battery B¹⁰. The diagrammatic view, Fig. 2, will be more readily understood in such a simplified form than it would be if it attempted to show all the mechanical details of the wiring. Above the rear end of each of the keys C', C², C³, C⁴, C⁵, C⁶, and C⁷, respectively, and in make-and-break relation therewith is a contact-piece $c'$, $c^2$, $c^3$, $c^4$, $c^5$, $c^6$, or $c^7$. With these contact-pieces the keys of the C group make connection when depressed; but said keys C', C², C³, C⁴, C⁵, C⁶, and C⁷ do not, when in their normal positions, make connection with the corresponding contact-pieces $c'$, $c^2$, $c^3$, $c^4$, $c^5$, $c^6$, and $c^7$. The frame C, before mentioned, is centered at C¹⁰ (being insulated from the main frame of the machine) and placed underneath the C-group keys in such a position that no one of said keys can be depressed without depressing said frame, rocking it on its center-rod. Immediately above the rearward-extending arm of said frame is a contact-piece $c$, with which said frame when in its normal position makes connection; but when said frame is depressed by the depressing of any of the keys C' C² C³ C⁴ C⁵ C⁶ C⁷ it breaks connection with its contact-piece $c$. With each of the contact-pieces $c$, $c'$, $c^2$, $c^3$, $c^4$, $c^5$, $c^6$, and $c^7$ before mentioned, respectively, is connected one terminal of each of the electromagnets E, E', E², E⁴, E⁵, E⁶, and E⁷, respectively, which magnets, it will be remembered, serve to actuate the frames $e$, $e'$, $e^2$, $e^3$, $e^4$, $e^5$, $e^6$, and $e^7$, respectively, and the other terminal of each of said electromagnets is connected with the wire B²¹. One pole of the battery B¹⁰, it has already been made clear, is connected with the metal center rod of the metal rocking frame 15, which frame, it will be remembered, overlies all the keys in such a position that when any key is depressed in front by the operator it rises behind, and thus raises the rocking frame B¹⁵—that is to say, tilts said frame upwardly on its center. When thus tilted upwardly by the depressing of a key, said frame, connected, as before described, by the wire B¹¹ with one pole of the battery B¹⁰, comes in contact with the spring B²² and establishes connection therewith. A wire B²³ serves to connect said spring with each and all of the keys B′, B², and B³ and with the frame B. The connection may be made in the manner illustrated in Fig. 4 with regard to wire B¹⁶ and key C⁴ or in any other suitable manner whatever. The details of wiring are not illustrated in Fig. 2, which is, as before said, a diagrammatic view intended only to illustrate the essential features of the electrical system without obscuring them by non-essential details, which every machine-designer arranges according to his own ideas. Above the rear end of each of said keys B′, B², and B³ is a contact-piece $b′$, $b²$, or $b³$, with which the key when depressed makes connection; but the keys B′, B², and B³ (like the keys C′, C², C³, C⁴, C⁵, C⁶, and C⁷) do not, when in their normal positions, make connection with the contact-pieces $b′$, $b²$, and $b³$. The frame B, before mentioned, is centered at $b^{10}$, being insulated from the main frame of the machine, and placed underneath the keys B′, B², and B³ in such a position that none of said keys can be depressed without depressing said frame. Immediately above the rearward-extending arm of said frame is a contact-piece $b$, with which said frame B when in its normal position makes connection; but when said frame is depressed by the depressing of any of the keys B′, B², or B³ said frame breaks the connection with its contact-piece $b$. With each of the contact-pieces $b$, $b′$, $b²$, and $b³$, respectively, one terminal of each of the electromagnets D, D′, D², and D³, respectively, is connected, which magnets, it will be remembered, control the frames $d$, $d′$, $d²$, and $d³$, respectively, and the other terminal of each of said magnets D, D′, D², and D³ is connected with the same conductor, B²¹, with which the non-contact-piece-connected terminals of the electromagnets E, E′, E², E³, E⁴, E⁵, E⁶, and E⁷ before mentioned as controlling the frames $e$, $e′$, $e²$, $e³$, $e⁴$, $e⁵$, $e⁶$, and $e⁷$ are connected.

We are now in a position to explain the actions which take place upon the depressing of a key. It will be convenient first to explain those actions by which a letter is made and afterward to explain the construction and operation of the releasing mechanism whereby the matrix-controlling levers P P are left free to return to their normal positions so soon as they act to free a matrix, although the keys controlling them are still held down, and the retarding mechanism by which the releasing of one of the two matrices which are released by the simultaneous depressing of keys of the right-hand and left-hand sets is delayed an instant to avoid possible interference with the other matrix released by the simultaneous action of the operator upon the keys, and other details of construction. But to explain the actions which take place upon the depressing of a key let us suppose the key B′ to be depressed. Said key, like all the other keys, when depressed by the operator in front of its center rises behind the center, thus tilting the frame 15 upwardly and establishing connection between one pole of the battery B¹⁰ and the spring B²², which is connected, it will be remembered, by the wire B²³ with the keys B′ B² B³ and the frame B. Moreover, said key B′, like the keys B² and B³, when depressed depresses the frame B, lying underneath said keys B′, B², and B³, breaking the electrical connection between said frame B and its contact-piece $b$ and electromagnet D. Lastly, said key B′ makes connection with the contact-piece $b′$ corresponding to it. The circuit of the battery B¹⁰ is now closed through the electromagnets D′ and E. The current flows from the battery B¹⁰ through the wire B¹¹ to the frame 15, and thence to the contact-spring B²², and from that through the wire B²³ to the key B′, and thence to the contact-piece $b′$, magnet D′, controlling the frame $d′$, wire B²¹, magnet E, controlling the frame $e$, to the contact-spring $c$, frame C, wire B¹⁶, adjustable contact-screw B¹⁵, contact-lever B¹³, and wire B¹², and from thence back to the other pole of the battery B¹⁰. The magnet E becoming thus energized, its armature draws down that end of the frame $e$ with which said armature is connected, thereby raising the other end of said frame $e$, to which the levers $f\,f\,f$ are pin-jointed. The magnet D′ becoming energized at the same time holds the frame $d′$ firm in its normal position, the magnet-connected arm $d^8$ resting firmly down upon the stop $d^9$. The character-corresponding lever $f$ underlying said frame $d′$ being thus afforded a fulcrum by said frame $d′$ tilts on said fulcrum as a center, its rear end moving down as the end pin-jointed to the frame $e$ is moved up, and thus (through the push-down wire $h$ acting upon the lever P) said lever $f$ throws the rod Q upward, that operates the escapement R $r′$ $r^2$, that controls the matrix $y$ corresponding to the letter required, so that it releases one of said matrices, so that said matrix falls upon the moving belt 111, whereby it is conveyed to the assembling-block. The other levers $f\,f$, pin-jointed to said frame $e$, rise and lift the frames $d^2$ and $d^3$, which overlie them, without at all affecting the escapement-controlling levers P P, with which said levers $f\,f$ are connected.

The electromagnet B²¹ forms a parallel path to the main circuit hereinbefore traced. Said magnet has one terminal connected with the wire B¹² and the other with the spring B²², and it serves to break the main circuit by attracting the contact-lever B¹³, before mentioned, (which is made of soft iron and serves as the armature of said magnet B²¹,) away from its normal position of contact with the adjustable contact-screw B¹⁵, thereby interrupting the main or working circuit, so that the magnets D' and E lose their magnetism and the various parts controlled by them return to their normal positions. The armature-lever B$^{13}$ is made to stand normally such a distance away from its magnet B$^{24}$ that the circuit is broken about the instant that the matrix $y$ controlled by the escapement R $r'$ $r^2$ is released. By these means the lever P, rod Q, and escapement R $r'$ $r^2$ are left free to return to their normal positions the instant the matrix $y$ is released without waiting for the keys to be released by the operator, which tends materially to increase the possible speed of working, and has also other important advantages. A contractile spring B$^{49}$ urges the contact-lever B$^{13}$ to its normal position of contact with the screw B$^{15}$.

We have seen what takes place when the key B' is depressed by itself alone. If either of the other keys of the B group were depressed by itself alone, similar actions to those above described would be produced; but the battery-circuit would now be closed either through the key B$^2$ or the key B$^3$, whichever was depressed, and thence through the contact-pieces $b^2$ or $b^3$ (according to which key was depressed) to the magnet D$^2$ or the magnet D$^3$, so that the frame $d^2$ or the frame $d^3$ would afford a fulcrum to the lever $f$ underlying it, thereby operating the proper escapement R $r'$ $r^2$ and releasing the proper matrix.

Now let us suppose one of the keys of the C group to be depressed by itself alone—say the key C'. This key, like every other key, (except the space-key G,) when depressed in front of its center rises back of its center, tilting the frame 15 upwardly and establishing connection between one pole of the battery B$^{10}$ and the spring B$^{22}$, which is connected, it will be remembered, by the wire B$^{23}$ with the keys B' B$^2$ B$^3$ and the frame B. Said key C' also, like the other C-group keys C$^2$, C$^3$, C$^4$, C$^5$, C$^6$, and C$^7$, when depressed depresses the frame C, lying underneath the C-group keys, breaking the connection between said frame C and its contact-piece $c$ and electromagnet E, and, lastly, said key C' makes connection with the contact-piece $c'$ corresponding to it. The circuit of the battery B$^{10}$ is now closed through the magnets E' and D and the current flows from the battery B$^{10}$ through the wire B$^{11}$ to the frame 15, and thence to the contact-spring B$^{22}$, and from that through the wire B$^{23}$ to the frame B, and thence to the contact-piece $b$ and magnet D (controlling the frame $d$) to the wire B$^{21}$, magnet E', controlling the frame $e'$, and so to the contact-spring $c'$, key C', wire B$^{16}$, adjustable contact-screw B$^{15}$, contact-lever B$^{13}$, and wire B$^{12}$, and thence back to the other pole of the battery B$^{10}$. The magnet E' becoming thus energized, its armature draws down upon that end of the frame $e'$ with which said armature is connected, thereby raising the other end of said frame or lever $e'$, to which the levers $f$ $f$ are pin-jointed. The magnet D becoming energized at the same time, its armature holds the frame $d$ firm in its normal position, with the arm $d^8$ resting down upon the stop $d^9$. The lever $f$ underlying said frame $d$ being thus afforded a fulcrum by said frame $d$ tilts on said fulcrum, its rear end moving down as the end connected with the frame $e'$ is moved up, and thus, through its push-down wire $h$, acting upon the lever P, throws up the rod Q, that operates the escapement R $r'$ $r^2$, which controls matrices corresponding to the letter required, thereby releasing one of said matrices, so that it falls upon the belt 111, whereby it is conveyed to the assembling-block 110. The other levers $f$ $f$ $f$, carried by said frame $e'$, rise and lift the frames $d'$, $d^2$, and $d^3$, which overlie them, without at all affecting the escapement-controlling levers P P, with which said levers $f$ $f$ are connected. At about the instant the matrix $y$ falls from its magazine-tube the releasing-magnet B$^{24}$, serving for the left-hand keys, breaks the circuit of the magnets D and E' in the manner already described, thus leaving the various parts free to return to their normal positions. If any of the other keys of the C group—as C$^2$, C$^3$, C$^4$, C$^5$, C$^6$, or C$^7$—be depressed by itself alone, the circuit will be closed through the parts already described, up to and including the magnet D, (controlling the frame $d$,) to the wire B$^{21}$, and thence through the magnet E$^2$, E$^3$, E$^4$, E$^5$, E$^6$, or E$^7$, as the case may be, corresponding to the key depressed, and so to the key C$^2$, C$^3$, C$^4$, C$^5$, C$^6$, or C$^7$, as the case may be, depressed, and thence through the wire B$^{16}$ and the rest of the path before described back to the other pole of the battery B$^{10}$. Each different key of the C group, it will be observed, affects a different one of the magnets E', E$^2$, E$^3$, E$^4$, E$^5$, E$^6$, and E$^7$, thereby operating a different one of frames $e'$, $e^2$, $e^3$, $e^4$, $e^5$, $e^6$, and $e^7$, and when any key of the C group is depressed alone the circuit is closed through the frame B and the electromagnet D, which controls the frame $d$, which latter affords a fulcrum to that particular one of the levers $f$ $f$ $f$ pin-jointed to the frame $e'$, $e^2$, or $e^3$, &c., operated by the key depressed, which underlies said frame $d$, while the other levers $f$ $f$ $f$, pin-jointed to the frame $e'$, $e^2$, $e^3$, $e^4$, $e^5$, $e^6$, or $e^7$, as the case may be, operated by the C-group key depressed, having no fulcrum in the center, move upon their points of connection with the push-down wires $h$ $h$ as centers and raise the frames $d'$, $d^2$, and $d^3$ overlying them without in any wise affecting the corresponding escapement-connected lever P P and escapements R $r'$ $r^2$. In like manner each of the keys B', B$^2$, and B$^3$ when depressed closes circuit through the magnet D', D$^2$, or D$^3$, which controls the frame $d'$ $d^2$ $d^3$, corresponding to the key depressed, and when any key of the B group is depressed by itself alone the circuit is closed through the frame C and magnet E, controlling the frame $e$, which coöperates with the particular frame $d'$, $d^2$, or $d^3$ affected by the B-group key depressed to print the proper character. Thus the frame C, it will be seen, serves the function of a C-group key and enables the operator to make letters from the B-group keys acting singly without being to the necessity of depressing a C-group key to control a frame in the group of frames $e$, $e'$, $e^2$, $e^3$, $e^4$, $e^5$, $e^6$, and $e^7$, and in like manner the frame B, it will be seen, serves the function of a B-group key and enables the operator to make letters from the keys of the C group acting singly without being to the necessity of depressing a B-group key to control a frame in the group of frames $d$, $d'$, $d^2$, and $d^3$. Thus while the making of any character requires the coacting of two frames, one from the group of frames $d$, $d'$, $d^2$, and $d^3$ and the other from the group of frames $e$, $e'$, $e^2$, $e^3$, $e^4$, $e^5$, $e^6$, and $e^7$, I make it possible, it will be seen, to produce letters with each of the keys acting singly, and thereby with the arrangement figured in the drawings I, in fact, make the ten most-frequently-occurring letters of the English alphabet, being about three-quarters of running letters, each by the action of a single key.

Let us now see how letters are made by depressing different combinations of keys. Two keys of the same B group with the construction figured in the drawings should not be depressed simultaneously, nor should two keys of the same C group; but any two keys depressed simultaneously and belonging one to the B group and the other to the C group make a different character—that is, release a different matrix, a matrix controlled only by such combination of keys, for when any two keys belonging one to the B group and the other to the C group are depressed simultaneously the circuit is closed through the magnet $D'$, $D^2$, or $D^3$, as the case may be, corresponding to the B-group key depressed, and also through the magnet $E'$, $E^2$, $E^3$, $E^4$, $E^5$, $E^6$, or $E^7$, as the case may be, corresponding to the C-group key depressed. Thus the particular frame $d'$, $d^2$, or $d^3$, as the case may be, corresponding to the particular B-group key depressed is made to coact with the particular frame $e'$, $e^2$, $e^3$, $e^4$, $e^5$, $e^6$, or $e^7$, as the case may be, corresponding to the particular C-group key depressed, and each different combination of two such coacting frames affects, as we have already seen, a different one of the levers $f\,f\,f$ and a different one of the levers P, escapements R $r'\,r^2$, and matrices $y\,y$, and thus produces a different character.

It has already been explained that the permutational character-selecting mechanism controlled by the right-hand or slow-acting set of keys is alike in kind to that controlled by the left-hand or quick-acting set of keys, but differs in respect of having a greater number of parts (levers $f\,f\,f$, frames $e\,e'\,e^2\,e^3$, &c., and magnets $E\,E'\,E^2\,E^3$, &c.) corresponding to the larger number of keys and matrices belonging to the left-hand or slow-acting set. All this has been already explained, and indeed appears plainly on the face of the drawings. In the drawings there are certain differences in respect of the electrical connections between the keys of the two sets. The electrical connections of the two sets of keys might, indeed, be made to be exactly alike, but it is convenient to make differences between the two, which I will now describe, so that when keys of the two sets are depressed simultaneously the magnets belonging to the permutational character-selecting mechanism serving for the right-hand or slow-acting set of keys act a fraction of a second after the similar magnets belonging to the permutational character-selecting mechanism of the left-hand or quick-acting set of keys. In this way I make sure that when keys of the two sets are depressed simultaneously to release a matrix from each of the two sets of matrices the matrix belonging to the quick-acting or primary-position set of matrices and corresponding to the first of the two letters which the operator designs to make at the same time will reach the assembling-block in advance of the matrix belonging to the slow-acting or secondary-position set of matrices corresponding to the second of the two letters which the operator thus makes at the same time.

The right-hand-controlled permutational character-selecting mechanism may be made to be slower-acting than the left-hand-controlled permutational character-selecting mechanism in various ways. A convenient arrangement of parts for this purpose is illustrated in Fig. 2. Connection from the battery $B^{10}$ to the wire $B^{23}$, leading to the B-group keys of the left-hand set is made from said battery $B^{10}$ by the wire $B^{11}$ to the frame 15 and contact-spring $B^{22}$ so soon as the key is depressed; but the current, instead of flowing direct from the contact-spring $B^{22}$ to the wire $B^{23}$ serving for the right-hand keys of the B group, (as it does from the spring $B^{22}$ to the wire $B^{23}$ serving for the left-hand or quick-acting set of keys,) goes from the contact-spring $B^{22}$ through a wire $B^{29}$ to a connection-lever $B^{30}$, which normally stands away from the corresponding contact-screw $B^{31}$, which latter is connected ($a$) by the wire $B^{23}$ with the B-group keys and frame B and ($b$) by another wire with the releasing-magnet $B^{24}$, serving for the right-hand-controlled circuits. The lever $B^{30}$, it will be seen, makes a gap in the working circuit of the right-hand-controlled keys. Said lever $B^{30}$ is normally held away from the contact-screw $B^{31}$, with which it closes circuit, by a contractile spring $B^{32}$, which holds said lever normally against the stop $B^{33}$. A magnet $B^{34}$ forms a parallel path to the main or working circuit of the right-hand-controlled keys, one terminal of said magnet being connected with the contact-spring $B^{22}$ and the other with the wire $B^{12}$. Said magnet becomes magnetized when the keys are depressed and the circuit closed from the battery $B^{10}$ through the magnet $B^{34}$ back to the other pole of the battery, and when so magnetized said magnet B³⁴ attracts the connection-lever B³⁰, which is of soft iron, and serves as its armature, so that said lever makes connection with the contact-screw B³¹, thus leaving the current free to flow from the battery B¹⁰ through the wire B²³ to the right-hand keys and the magnet controlled thereby. When keys of the two sets are depressed simultaneously, some time elapses between the closing of the left-hand-controlled circuits and the circuit of the magnet B³⁴ on the one hand (both of which are closed the instant the frame 15 comes in contact with the spring B²²) and the closing, on the other hand, of the right-hand-controlled working circuit through the action of the magnet B³⁴ upon the lever B³⁰. This interval of time may be made greater or less, as desired, (a) by varying the time-constant of the circuit of the magnet B³⁴ or (b) by regulating the play of the armature of the magnet B³⁰ and the strength of its spring B³².

A self-induction 25 may be inserted in the working circuit of the right-hand keys. Such self-induction may be made advantageously of low resistance and with a closed iron magnetic circuit of sufficient cross-section to give the amount of self-induction necessary to produce the retarding action required. The self-induction 25, if it be given a sufficient amount of inductance, may be used as the only retarding device, and the magnet B³⁴, with its armature B³⁰, may be dispensed with, (the wire B²³, leading to the right-hand B-group keys, being in such case connected directly with the contact-spring B²²,) and, on the other hand, the self-induction 25 may be entirely dispensed with, the magnet B³⁴ and armature B³⁰ being adjusted in such a manner that the armature B³⁰ does not close circuit with the contact-screw B³¹ until a sufficient length of time has elapsed after the closing of the left-hand-controlled working circuit.

The releasing-magnet B²⁴ serving for the right-hand-controlled working circuits operates in exactly the same manner as the magnet B²⁴ serving for the left-hand-controlled working circuit, and already fully described, to break the right-hand-controlled working circuit about the instant the matrix controlled by the action of the magnets D, D', D², or D³ and E, E', E², or E³, &c., is released. A suitable self-induction similar, for example, to the self-induction 25, before described, may be inserted, if desired, in the circuit of the magnet B³⁴ or in the circuit of either of the magnets B²⁴ B²⁴. Thus, it will be seen, when a key or a combination of keys belonging to the left-hand or quick-acting set is depressed simultaneously with a key or a combination of keys belonging to the right-hand or slow-acting set, thereby to produce a letter from each set of keys, the matrix released by the action of the left-hand or quick-acting set of keys belongs to the quick-acting set of matrices, Fig. 1, and stands closer to the assembling-block 110 than the matrix released by the action of the right-hand or slow-acting set of keys which belongs to the slow-acting set of matrices and lies more remote from the assembling-block 110, so that if the two matrices fell at the same instant upon the conveying-belt 111 the one belonging to the quick-acting or primary-position set of matrices and controlled by the keys of the quick-acting set would reach the assembling-block in advance of the matrix belonging to the slow-acting or secondary-position set of matrices controlled by the right-hand set of keys, merely by reason of the fact that the matrices of the quick-acting or primary-position set lie closer to the assembling-block than the matrices of the slow-acting set. On the other hand, independently of the fact that the matrices belonging to the quick-acting set fall upon the conveying-belt 111 nearer to the assembling-block 110 than the matrices of the slow-acting set do, the connections between the keys of the two sets and the escapement devices R r' r² (of which one only is illustrated in the drawings) are made to be quick-acting for the left-hand set of keys and slow-acting for the right-hand set of keys, so that on this account also the two matrices released by simultaneous actions of the operator are made to take position in due order in the line of matrices being assembled.

It would be possible to insure the delivery upon the assembling-block in proper order of the matrices belonging to the two sets and controlled, respectively, by the left-hand and right-hand set of keys, either solely (a) by the different positions given to the quick-acting and the slow-acting sets of matrices with reference to the assembling-block, (the quick-acting set of matrices being arranged, as beforesaid, in proximity to the assembling-block and the slow-acting set of matrices more remote therefrom,) or (b) by the difference in the rapidity of action given to the connections interposed between the two sets of keys and the escapements controlling the release of the matrices, (the connections between one set of keys and the escapements controlling the release of the matrices of such set being made to be quick-acting, while the connections between the keys of the other set and the escapements controlling the release of the matrices corresponding to such keys being made to be slow-acting;) but I prefer to use a combination of the two methods. As a modification or alternative form of the first method above pointed out I would say that the requisite difference in the rapidity of action of the quick-acting set of matrices and the slow-acting set of matrices may also be made, either in whole or in part, by making the lower ends of the magazine-tubes 100, containing the matrices of the quick-acting set, with the escapements whereby such matrices are released, to lie closer in respect of horizontal position to the assembling-block 110 and conveying-belt 111 than the magazine-tubes 101, containing the matrices of the slow-acting set, do, with the escapements whereby such matrices are released. The essential thing is to use two sets of lower-case or other similar matrices with suitable controlling mechanism, and to arrange the whole in such a manner that the matrices of the one set and of the other set will always reach their proper relative positions in the line of matrices being assembled, though the keys controlling such two matrices be acted upon by the operator at the same instant. Many variations in the mechanism employed for this purpose can be made by the skilled mechanic without departing from the essential features and the spirit of my invention, and I wish it to be very distinctly understood that I do not at all limit myself to the details of construction shown, the essential point being, as before said, the combination of two sets of lower-case or other similar matrices with suitable controlling mechanism arranged and operating in such manner that the matrices of the one set come into position in the line of matrices being assembled to the left or in advance of the matrices of the other set, though the keys releasing them be acted upon by the operator at the same instant.

The mechanism illustrated in the drawings whereby the matrices after they have been dropped from the magazine-tubes are composed into a line is, as the drawings clearly show, the mechanism invented by Mergenthaler and which is well known in the art and widely used in the Mergenthaler linotype-machines. Its essential parts are the belt 111, hereinbefore referred to, moving on pulleys 112 and 113, (said pulleys being driven by any suitable mechanism—for example, that used in the Mergenthaler machine and well known in the art.) The matrices or type-plates fall upon said belt 111 as they are released by the escapements, as R $r'$ $r^2$, and are carried by said belt to the assembling-block 110. The star-wheel or cam-wheel 114 serves as it revolves to shove or tap the matrices into place in the line as they are delivered upon the assembling-block by the belt 111 aforesaid. The construction and arrangement of these parts (the assembling-block 110, the belt 111, the pulleys 112 and 113, and the cam-wheel 114, with their subsidiary parts) are described in the patents to Mergenthaler above mentioned. They are well known in the art and they work very satisfactorily, but they are not of my invention, being, as before said, old and well known in the art, and any other suitable mechanism or device whatever may be substituted for them without departing from the principles of my invention.

*Of the distributing mechanism.*—In its essential features the distributing mechanism employed in carrying out my invention need not differ from that in common use in the art. I shall not, therefore, describe all the details of the distributing mechanism. The distributing mechanism illustrated in the accompanying drawings is of the kind which, to the best of my information, was first invented by Ottmar Mergenthaler. Descriptions of this general type of distributing mechanism may be found in the patents to said Mergenthaler before mentioned, to which reference has been hereinbefore had and made—to wit, No. 317,828, dated May 12, 1885; Nos. 347,629 and 347,630, dated August 17, 1886, and Nos. 436,531 and 436,532, dated September 16, 1890, particularly that of August 17, 1886, No. 347,629.

In the Mergenthaler linotype-machines now in general use the matrices are transferred, after the linotype or slug has been cast, from the position which they occupy when the slug is being cast to a rail which is known in the art as the "distributing-rail," the construction of which is described with much detail in the patents before mentioned, particularly that of August 17, 1886, No. 347,629. One does not need to change in any material particular the mechanism now employed in the well-known Mergenthaler machines for transferring the matrices from the positions which they occupy when the slug is being cast to the distributing-rail, and therefore I will not burden this specification with a description of said mechanism, such mechanism being well known to all persons skilled in the art and being described in the patents hereinbefore mentioned and to which reference has been hereinbefore had and made. After the matrices have been transferred to the distributing-rail they are advanced along the same by feed mechanism well known in the art—usually a pair of feed-screws, a description of the construction and arrangement of which may be found in the patent before mentioned, No. 436,531, dated September 16, 1890, and which will therefore require no description here. In the Mergenthaler machine the distributing-rail is furnished with teeth which differ from point to point on the rail in number and arrangement. The matrices also have teeth and every matrix has a different number of teeth or has the teeth upon it differently arranged to engage the rail, and the rail is constructed in such a manner that each matrix as it is being fed along the rail from the point where it first engages the rail to its magazine-tube has one or more teeth on each side of the rail in engagement with the corresponding teeth formed upon the rail till said matrix reaches its magazine-tube, where the rail is so formed that the matrix no longer engages the rail and therefore falls off into the magazine-tube, all this being well known in the art and fully described in the patents before mentioned, to which reference has been hereinbefore had and made.

I shall not burden this specification with any further description of this mechanism; but I have hereinbefore said that the corresponding matrices of the two sets should be distributed each to its own place, and I will mention one convenient mode of arranging matters so that the matrices belonging to the quick-acting set will always be distributed to the magazine-tubes of the quick-acting set, while the matrices belonging to the slow-acting set will always be distributed to the proper magazine-tubes belonging to the slow-acting set of matrices. Let us suppose the machine constructed to embody my invention to be patterned after that of Mergenthaler and to have ninety kinds of matrices—that is, matrices for ninety different characters—in the slow-acting set (being the number now usually employed in a linotype-machine) and to have, say, thirty kinds of matrices—that is, matrices corresponding to thirty different characters, the twenty-six letters of the alphabet, lower case, and a few of the more-frequently-occurring marks of punctuation—in the quick-acting set, and that said thirty characters of the quick-acting set, counting from left to right, exactly correspond to the first thirty characters of the slow-acting set, counting from left to right—that is to say, let the quick-acting set of matrices consist of the twenty-six letters of the alphabet, lower case, and a few of the more-frequently-occurring marks of punctuation, arranged in any desired order and let the first portion or section of the slow-acting set of matrices consist of the same lower-case letters and the same marks or punctuation, all arranged in the same order. That portion of the distributing-rail which serves to distribute the ninety matrices of the slow-acting set may be formed in the same manner as the distributing-rail of the well-known Mergenthaler machines is formed to distribute its ninety characters, and that portion of said rail which serves to distribute the thirty different matrices of the quick-acting set (and which correspond, it will be remembered, to the first thirty matrices of the slow-acting set of matrices) may be formed in all respects exactly like that section of the rail which serves for the first thirty matrices of the slow-acting set, but with one tooth $a$, Figs. 6 to 9, added, on which tooth all the matrices of the slow-acting set ride past the magazine-tubes of the quick-acting set of matrices. The matrices, in short, of the slow-acting set of ninety may be made each as the corresponding matrices of the set of ninety now in common use are made, except that each is provided with an additional tooth $a'$ to engage that tooth $a$, before mentioned, of the distributing-rail 130 which extends continuously along that whole portion of the rail which overlies the magazine-tubes of the quick-acting set of matrices, and the matrices of the quick-acting set may be made each exactly like the corresponding matrix of the slow-acting set—that is, the matrix of the slow-acting set bearing the same character—except that it wants the tooth $a'$, before mentioned, with which the corresponding matrix of the slow-acting set is furnished, and which serves to engage the tooth $a$, before mentioned, of the distributing-rail, which carries the matrices of the slow-acting set past the magazine-tubes of the matrices of the quick-acting set. The construction is illustrated in Figs. 6 to 11, in which Fig. 6 illustrates that portion of the distributing-rail which serves to distribute the matrices of the quick-acting set, and Fig. 7 the next contiguous and consecutive portion of said rail, which serves to distribute the matrices of the slow-acting set corresponding to the matrices of the quick-acting set. The two parts of the rail, it will be seen, are or may be exactly like each other in all respects, except that the portion of said rail illustrated in Fig. 6 serving to distribute the matrices of the quick-acting set is provided with the continuous tooth $a$, on which the matrices of the slow-acting set ride past the magazine-tubes belonging to the matrices of the quick-acting set, which tooth is cut away as soon as the magazine-tubes of the slow-acting set are reached. Fig. 8 is a cross-section of the distributing-rail on the line 8 8, Fig. 6, and Fig. 9 is a cross-section through the corresponding part of said rail, Fig. 7. Fig. 10 illustrates a matrix of the quick-acting set, and Fig. 11 a matrix of the slow-acting set, the matrix of the slow-acting set being provided with a tooth $a'$ to ride on the tooth $a$ of the distributing-rail past the magazine-tubes of the quick-acting set of matrices, while the matrix illustrated in Fig. 10 belonging to the quick-acting set of matrices is filed away, so that it does not engage with the tooth $a$ of the distributing-rail, that serves, as before mentioned, to carry the matrices of the slow-acting set past the magazine-tubes belonging to the matrices of the quick-acting set; but I merely describe this construction as one convenient way of arranging the distributing-rail and the matrices, so that matrices corresponding to the same character but belonging one to the quick-acting set and the other to the slow-acting set will be distributed each to its own proper chamber in the magazine; but I do not lay any stress upon it or attach any special importance to it, and persons skilled in the art can readily arrange the teeth of the distributing-rail and of the matrices so as to accomplish the end above mentioned upon principles and by means already well known in the art. Moreover, other distributing mechanisms than the toothed rail above mentioned are well known in the art and may be used. See, for example, the patent to Mergenthaler, before mentioned, No. 317,828, dated May 12, 1885, and the patent to Scudder, No. 506,198, dated October 3, 1893.

I have illustrated my invention in the accompanying drawings and described it for the most part in this specification as applied to a Mergenthaler linotype-machine, because those machines are the most generally used and the most widely known of all line-casting machines; but essential features of my invention may be used in connection with other known forms of linotype and line-casting machines than that of Mergenthaler, and I wish it to be distinctly understood that I do not at all limit myself to applying my invention in connection only with machines like that of Mergenthaler.

I do not claim herein the form of permutational character-selecting mechanism illustrated in the accompanying drawings, for the same forms a part of the subject-matter of the Letters Patent aforesaid, No. 600,120, which have issued upon the original application, Serial No. 609,489, filed October 21, 1896, of which application this application is a division; nor, on the other hand, do I limit myself to using the sort of permutational character-selecting mechanism illustrated in the accompanying drawings, for various other forms of permutational character-selecting mechanism are known in the art. Several have been invented by myself, and any suitable form of permutational character-selecting mechanism whatever may be used, and while it is very advantageous to use permutational character-selecting mechanism of some suitable kind and a great increase in speed results from using such mechanism I do not at all limit myself, I wish it to be understood, in respect of certain important features of my invention set forth in the statement of claim at the end hereof, to the use of permutational character-selecting mechanism. Obviously (a) the levers P P might be used as keys, and the permutational character-selecting mechanism might be omitted, a separate key-lever being used for each character of each set, as illustrated in dotted lines in Fig. 13, or, (b,) the permutational character-selecting mechanism being omitted and the number of the keys being increased, each of the keys B' B² B³ C' C² C³, &c., might be connected with the corresponding lever P by means of an electromagnet 120, the essential features of the construction in respect of being quick-acting for the keys of the one set and slow-acting for the keys of the other set being retained. This construction is illustrated diagrammatically in Figs. 12 and 13. Obviously the levers $ff$, Figs. 3 and 4, or the magnets 120, Figs. 12 and 13, might be connected with the escapement devices R $r'$ $r^2$ by means simpler and more direct than those invented by Mergenthaler (see the patent before mentioned to him, No. 436,532, dated September 16, 1890) and illustrated in Figs. 4 and 13 of the accompanying drawings. (See, for example, the diagrammatic view Fig. 14, in which the levers $ff$ are connected directly by the pull-down rods Q Q to actuate the escapement-lever R, and Fig. 15, in which the armature 121 of the electromagnet 120, through its pull-down wire $h$, acts directly upon the lever R.)

Many variations of every sort may be made by the skilled mechanic without at all departing from the spirit of my invention.

The line of matrices is transferred by different devices in different machines from the point at which it has been assembled to the point where the casting operation takes place. I have not illustrated the mechanism for this purpose in detail in the drawings, because it is not necessary to an understanding of my invention. I prefer, as before said, to use the mechanism for this purpose invented by Mergenthaler, described in the patents before mentioned and well known and widely used in the art; but I do not at all limit myself to using the mechanism for this purpose invented by Mergenthaler, for other forms of mechanism for the same purpose are also well known in the art, and any suitable form whatever may be used; and so far as my invention is concerned the slug might, perhaps, be cast at the point where the matrices are formed into a line.

In different machines different devices are used for casting the line, all, however, acting upon the same general principles, which are well understood in the art. The mechanism illustrated in the drawings is patterned upon that of Mergenthaler, and in it O is the mold-wheel; but the details of the casting mechanism, being already well understood in the art, are not illustrated in the drawings, nor need they be described here; but I wish it to be understood that I do not at all limit myself to using the casting mechanism of Mergenthaler in carrying out my invention, for any other suitable form of casting devices whatever, of which several, as before said, are well known in the art, may be used instead. Nor do I indeed limit myself to using casting mechanism at all, for it is well known to all persons skilled in the art that an impression may be taken from the assembled line of matrices or type-plates otherwise than by casting—for example, by pressing a suitable plastic or other substance against the line of matrices or type-plates after they have been assembled. Most obviously my invention may be applied in connection with devices of the sort last named, in which the impression is taken from the assembled line of matrices or type-plates by pressing a suitable substance against them, as well as in connection with devices in which the assembled line of matrices or type-plates is used as a mold from which to cast a slug.

By the "distributing mechanism" or "distributing devices," terms which are used synonymously in this specification, I refer to the mechanism by which the matrices, after the linotype or slug has been cast or the impression otherwise taken from the assembled line of matrices, are distributed each to its own place. The distributing mechanism illustrated in the accompanying drawings is, as before said, like that of Mergenthaler; but I do not, as before said, attach any special importance to it or at all limit myself to using it in carrying out my invention, for other forms of distributing mechanism are known in the art, and any suitable form of distributing mechanism whatever may be used.

I use the terms "primary-position matrices" and "quick-acting matrices" synonymously in this specification; also, I use the words "slow-acting matrices" and "secondary-position matrices" synonymously in this specification. The sense in which I use these terms has already been defined.

Frequently in this specification and in the statement of claim at the end hereof I speak in effect of a "set of matrices." A "set of matrices" does not mean, as I use the term in this specification, a complete set, including all the characters required to set up a line or a page, nor does a "set of lower-case matrices" mean a complete set of matrices corresponding to the twenty-six letters of the alphabet. By a "set of matrices" I mean a sufficient number to produce a useful effect, and a much smaller number of matrices may be used in one of the sets than the twenty-six letters of the alphabet. Thus, to illustrate, we might have in the quick-acting or primary-position set, say, a dozen kinds of matrices only, corresponding to the twelve most-frequently-occurring letters of the alphabet. On account of the frequency with which these letters occur the operator would be able in the great majority of cases to select a pair of matrices simultaneously, and in those cases in which he was not able to select two matrices at the same time he could select such matrices singly, each from the set containing it. It is better, however, to employ in each set of matrices a lower-case alphabet complete or nearly complete; but some of the less-frequently-occurring letters—such, for example, as "j," "k," "q," "v," "x," and "z"—might be omitted from one of the two sets of matrices with scarce any loss in the speed of the machine, such letters being of very infrequent occurrence.

I use the term "line-casting machine or other similar instrument" in the statement of claim at the end hereof as a broad generic term, including (a) all linotype-machines, (b) all line-casting machines, (c) all circulation-machines in which circulating matrices or type-plates are composed into a line, whether the impression or copy be taken from the assembled line of matrices or type-plates by casting or by pressure or in any other manner, (d) all machines of whatever kinds (and whether of the circulation variety or not) in which type are assembled into line by mechanism as a result of the depressing of keys by an operator, and (e) all other type-setting, type-casting, matrix-making, or type-forming instrumentalities which are so far similar to a line-casting machine that my invention may be applied to them or used in connection with them.

By "two sets of circulating matrices or type-plates of the same case" I mean that the matrices or type-plates include either (a) two sets of upper-case or capital-letter matrices or type-plates or (b) two sets of lower-case or small-letter matrices or type-plates. It is of course most advantageous to employ two sets of lower-case matrices or type-plates, as shown in the drawings, and very obviously two sets of matrices or type-plates might be used, each containing both upper-case and lower-case characters, in which latter case we would have two sets of matrices or type-plates of the same case (upper case) and also two other sets of matrices or type-plates of the same case, (lower case.)

The two sets of matrices or type-plates which I use (and which are contained, preferably, in the one magazine) are used, it will be observed, to enable the operator to set up the type more rapidly, and to this end the letters of the two sets are of the same face, by which I mean that the differences in face, if any, between the letters of the two sets are so small that the letters of the two sets and of the same case can be used in setting up the same words, some letters of a word being taken from one set of matrices or type-plates and the others from the other set of matrices or type-plates, as hereinbefore described. In this respect my invention differs radically from certain prior inventions—such, for example, as that shown in the patent to Mergenthaler, No. 543,497, dated July 30, 1895, in which a second or supplemental magazine (marked H in the drawings of said Letters Patent No. 543,497) is used for sorts different in face from the characters used in the main magazine, (marked A in said Letters Patent No. 543,497,) and that shown in the patent to Dodge, No. 548,432, dated October 22, 1895, in which a plurality of magazines are used, each containing a different style or face of type, and in both of which patents (No. 543,497 to Mergenthaler aforesaid and No. 548,432 to Dodge aforesaid) the different sets of matrices or type are used solely as a means of obtaining a larger number of styles of characters and in which the matrices or type are selected by the operator always one at a time.

The term "composing mechanism" is commonly used in the art in a broad sense as including all the mechanism, of whatever kind, by which the line of matrices or type-plates is composed—that is to say, all the mechanism, of whatever kind, by which the matrices or type-plates are transferred from their normal positions in the magazine-tubes or other storing-receptacles or storing devices to their places in the line of matrices or type-plates being assembled. In this broad sense the releasing devices, of whatever kind used, are a part of the composing mechanism. So are the keys. So are the connections between the keys and the releasing devices. In a narrower sense the term "composing mechanism" is often used to include only the mechanism by which the matrices or type-plates after they have been released or discharged from the magazine-tubes or other storing devices are assembled in due order into the line which is being composed.

When I speak in any of the claims at the end hereof of "releasing devices" or of "keys and releasing devices" and afterward in the same claim use the term "composing mechanism," I use said term in its narrower sense, above explained, and as exclusive of the releasing devices; but when I use the term "composing mechanism" in any of the claims at the end hereof without mentioning "releasing devices" in the same claim I use the term "composing mechanism" in its broader sense, above explained, as including all the mechanism, of whatever kind, by which the line of matrices or type-plates is composed.

Various forms of composing mechanism are well known in the art. Different kinds are used in different machines. New forms are being devised constantly. The form of composing mechanism illustrated in the drawings is the best that I am aware of; but I do not at all limit myself to it, and I wish it to be very distinctly understood that any other kind of composing mechanism whatever that is suitable for the purpose may be used, instead of the composing mechanism illustrated in the drawings, in combination with the two sets of matrices or type-plates of the same case in carrying out my invention.

By the term "releasing devices" as used in the statement of claim at the end hereof I mean devices by which the matrices or type-plates are released, discharged, or otherwise taken from their normal positions to be set in a course or process of motion toward the line of matrices or type-plates being assembled. In particular I use said term "releasing devices" to cover as well those devices by which the matrix or type-plate is positively discharged or otherwise positively taken from the magazine-tube or other storing device, where it normally rests, as to those devices in which the matrix or type-plate is merely permitted to escape or fall under the force of gravity.

Various forms of releasing devices are well known in the art. The form of releasing device illustrated in the drawings (which is, in fact, the old and well-known releasing device of Mergenthaler) I consider to be as good as any other; but I do not at all limit myself to it and wish it to be very distinctly understood that any other suitable releasing device whatever may be used instead thereof in the carrying out of my invention.

By the "primary-letter matrices or type-plates" or the "primary-letter set of matrices or type-plates" I mean the set of matrices or type-plates from which when the operator acts upon a plurality of keys simultaneously to select a pair of matrices or type-plates corresponding to a pair of consecutive letters the matrix or type-plate corresponding to the first letter of such pair is taken, and by the "secondary-letter matrices or type-plates" or the "secondary-letter set of matrices or type-plates" I mean the set of matrices or type-plates from which when the operator acts upon a plurality of keys simultaneously to select a pair of matrices or type-plates corresponding to a pair of consecutive letters the matrix or type-plate corresponding to the second letter of such pair is taken.

By the term "primary-letter-releasing devices" I mean releasing devices which (when the operator acts upon a plurality of keys to select a pair of matrices corresponding to a pair of consecutive letters simultaneously) release the matrix or type-plate corresponding to the first letter of such simultaneously-selected letters, and by the term "secondary-letter-releasing devices" I mean releasing devices which (when the operator acts upon a plurality of keys to select a plurality of matrices or type-plates corresponding to a pair of consecutive letters simultaneously) release the matrix or type-plate corresponding to the second letter of the pair of simultaneously-selected letters.

The word "matrix" is often used (and I have so used it heretofore in this specification) as covering the part or piece upon which the character is formed, whether such character is formed in intaglio or in cameo. In strict propriety, however, the word "matrix" is more properly used of a part having the character formed upon it in intaglio. The word "type-plate" also is sometimes used to cover a part upon which the character is formed, whether in cameo or in intaglio; but in strict propriety the word "type-plate" refers more properly to a plate, part, or piece upon which the character is formed in cameo.

In the statement of claim at the end hereof I use the word "matrix" as referring to a part upon which the character is in intaglio and the word "type-plate" as referring to a plate, part, or piece upon which the character is in cameo or relief. Of course a matrix or type-plate may carry a single letter or a plurality of letters. Obviously either matrices or type-plates may be used in the carrying out of my invention. They are well-known equivalents of each other, and I wish it to be very distinctly understood that I do not at all limit myself to either, but reserve the right to use both.

While my machine is designed to be operated with the two hands acting simultaneously upon the two sets of keys, each hand on its own set of keys, thereby to select a plurality of matrices simultaneously, very obviously it may be otherwise operated. Obviously each set of matrices might be used by itself alone and a whole word or line set up from a single set of matrices, and, which is more important, obviously an operator may, if he find it difficult to learn to use his two hands simultaneously, use them, say, alternately, each on its own set of keys, selecting, say, with the left hand on its set of keys the first, third, fifth, seventh, ninth, &c., letters of a word and selecting with the right hand on its set of keys the second, fourth, sixth, eighth, tenth, &c., letters. This mode of operating the machine would not be so rapid as using the two hands simultaneously on the two sets of keys to select matrices in pairs, but it would be much more rapid than the machines now in use. I do not, therefore, limit myself to any one mode of operating the machine, but reserve the right to operate it in any manner.

Finally, I desire it to be understood that I do not at all restrict myself to the mechanical details hereinbefore described in illustration of my invention. Manifestly these can be very widely varied in many particulars by skilled mechanics without material change in result and without essential departure from the spirit of the invention; but What I do in this application claim as new and of my invention, and desire to secure by Letters Patent, is as follows, to wit:

1. In a line-casting machine or other similar instrument, two sets of circulating matrices or type-plates of the same case and face in combination with composing mechanism constructed to assemble matrices or type-plates of the two sets aforesaid in due order into the same line.

2. In a line-casting machine, or other similar instrument, means constructed to afford facility to the operator to select a plurality of matrices or type-plates, corresponding to consecutive letters of a word, simultaneously, and including two sets of circulating matrices or type-plates of the same case and composing mechanism, whereby matrices or type-plates of the two sets aforesaid are simultaneously arranged in due order in a line.

3. In a line-casting machine or other similar instrument, two sets of circulating matrices or type-plates of the same case and face in combination with composing mechanism constructed to assemble matrices or type-plates of the two sets aforesaid in due order into the same line; the matrices or type-plates of one of the two sets aforesaid being normally disposed in proximity to the line of matrices or type-plates being assembled, and the matrices or type-plates of the other set aforesaid being normally disposed more remote from the line of matrices or type-plates being assembled.

4. In a line-casting machine, or other similar instrument, means constructed to afford facility to the operator to select a plurality of matrices or type-plates, corresponding to consecutive letters of a word, simultaneously, and including in combination with suitable composing mechanism, two sets of circulating matrices or type-plates of the same case; the matrices or type-plates of the one set being normally disposed in proximity to the line of matrices or type-plates being assembled, and the matrices or type-plates of the other set being normally disposed more remote from the line of matrices or type-plates being assembled.

5. In a line-casting machine or other similar instrument, and in combination, two sets of circulating matrices or type-plates of the same case and face; the matrices or type-plates of one set being normally disposed in proximity to the line of matrices or type-plates being assembled, and the matrices or type-plates of the other set being normally disposed more remote from the line of matrices or type-plates being assembled; releasing devices for the set of matrices or type-plates above mentioned as disposed in proximity to the line of matrices or type-plates being assembled; keys controlling said releasing devices; other releasing devices for the other set of matrices or type-plates above mentioned, and other keys controlling said releasing devices; and means constructed to assemble the matrices released from the two sets aforesaid in due order in the same line.

6. In a line-casting machine, or other similar instrument, means constructed to afford facility to the operator to select a plurality of matrices or type-plates, corresponding to consecutive letters of a word, simultaneously, and including in combination with suitable composing mechanism, two sets of circulating matrices or type-plates of the same case; the matrices or type-plates of one set being normally disposed in proximity to the line of matrices or type-plates being assembled, and the matrices or type-plates of the other set being normally disposed more remote from the line of matrices or type-plates being assembled; releasing devices for the set of matrices or type-plates above mentioned as disposed in proximity to the line of matrices or type-plates being assembled; keys controlling said releasing devices; other releasing devices for the other set of matrices or type-plates above mentioned, and other keys controlling said releasing devices; the whole being constructed, arranged and operating in such a manner that when matrices or type-plates of the two sets aforesaid are released by or in consequence of simultaneous actions of the operator upon keys of the two sets aforesaid, one matrix or type-plate from each set, the matrix or type-plate released from the set of matrices or type-plates before mentioned as being disposed in proximity to the line of matrices or type-plates being assembled, reaches a position in the line of matrices or type-plates being assembled, in advance of the matrix or type-plate of the other set, released by the simultaneous action of the operator; so that two matrices or type-plates released by or in consequence of simultaneous actions of the operator, follow each other in due order in the line of matrices or type-plates being assembled.

7. In a line-casting machine, or other similar instrument, means constructed to afford facility to the operator to select a plurality of matrices or type-plates, corresponding to consecutive letters of a word, simultaneously, and including (a) two sets of matrices or type-plates of the same case; (b) primary-letter-releasing devices, whereby the matrices or type-plates corresponding to the first letters of the consecutive pairs of letters are released; (c)

secondary-letter-releasing devices, whereby the matrices or type-plates corresponding to the second letters of the consecutive pairs of letters are released; and (d) suitable composing mechanism, whereby the matrices or type-plates of the two sets aforesaid are simultaneously assembled into line; the whole being constructed, arranged and operating in such a manner that when matrices or type-plates of the two sets are released by or in consequence of simultaneous actions of the operator, one matrix or type-plate from each set, the matrix or type-plate released by the primary-letter-releasing devices reaches a position in the line of matrices or type-plates being assembled, in advance of the matrix or type-plate of the other set, released by the secondary-letter-releasing devices; so that the two matrices or type-plates released by or in consequence of simultaneous actions of the operator are made to follow each other in due order in the line of matrices or type-plates being assembled.

8. In a line-casting machine, or other similar instrument, means constructed to afford facility to the operator to select a plurality of matrices or type-plates, corresponding to consecutive letters of a word, simultaneously, and including in combination with suitable composing mechanism, two sets of matrices or type-plates of the same case; the matrices or type-plates of one set being disposed in proximity to the assembling-block, and the matrices or type-plates of the other set being disposed more remote from the assembling-block.

9. In a line-casting machine, or other similar instrument, means constructed to afford facility to the operator to select a plurality of matrices or type-plates, corresponding to consecutive letters of a word, simultaneously, and including in combination with suitable composing mechanism, two sets of matrices or type-plates of the same case; the matrices or type-plates of one set being disposed in proximity to the assembling-block, and the matrices or type-plates of the other set being disposed more remote from the assembling-block; releasing devices for the set of matrices or type-plates above mentioned as disposed in proximity to the assembling-block; keys, controlling said releasing devices; other releasing devices for the other set of matrices or type-plates above mentioned; and other keys controlling said releasing devices; the whole being constructed, arranged and operating in such a manner that when matrices or type-plates of the two sets are released by or in consequence of simultaneous actions of the operator, one matrix or type-plate from each set, the matrix or type-plate released from the set of matrices or type-plates before mentioned as being disposed in proximity to the assembling-block, reaches a position in the line of matrices or type-plates being assembled, in advance of the matrix or type-plate of the other set, released by the simultaneous action of the operator; so that two matrices or type-plates released by or in consequence of simultaneous actions of the operator, follow each other in due order in the line of matrices or type-plates being assembled.

10. In a line-casting machine, or other similar instrument, means constructed to afford facility to the operator to select a plurality of matrices or type-plates, corresponding to consecutive letters of a word, simultaneously, and including two sets of matrices or type-plates of the same case, to wit, a set of primary-letter matrices or type-plates and a set of secondary-letter matrices or type-plates, in combination with suitable composing mechanism whereby matrices or type-plates of the two sets aforesaid are simultaneously assembled into the same line.

11. In a line-casting machine, or other similar instrument, means constructed to afford facility to the operator to select a plurality of matrices or type-plates, corresponding to consecutive letters of a word, simultaneously, and including in combination with suitable composing mechanism, two sets of matrices or type-plates of the same case, to wit, a set of primary-letter matrices and a set of secondary-letter matrices; keys and releasing mechanism controlled by them, operating to release the primary-letter matrices or type-plates aforesaid; other keys and releasing devices controlled by them, operating to release the secondary-letter matrices or type-plates aforesaid; and means operating when keys of the two sets aforesaid are acted upon simultaneously by the operator, thereby to release two matrices, or type-plates, one from each of the two sets of matrices or type-plates above mentioned, to cause the matrix or type-plate released from the primary-letter set of matrices or type-plates, to reach a position in the line of matrices or type-plates being assembled in advance of the matrix or type-plate released, by or in consequence of the simultaneous action of the operator upon the appropriate key or keys, from the secondary-letter set of matrices or type-plates.

12. In a line-casting machine or other similar instrument, two sets of matrices or type-plates of the same case and face, in combination with composing mechanism, including (a) a set of keys for the right hand, controlling one of the two sets of matrices or type-plates above mentioned, (b) a set of keys for the left hand, controlling the other set of matrices or type-plates above mentioned, and (c) means constructed to assemble matrices or type-plates of the two sets aforesaid, in due order in the same line.

13. In a line-casting machine, or other similar instrument, means constructed to afford facility to the operator to select a plurality of matrices or type-plates, corresponding to consecutive letters of a word, simultaneously, and including two sets of matrices or type-plates of the same case, to wit, a set of primary-letter matrices or type-plates, and a set of secondary-letter matrices or type-plates in combination with suitable composing mechanism, including a set of keys for the right hand, controlling one of the two sets of matrices or type-plates above mentioned, and a set of keys for the left hand, controlling the other set of matrices or type-plates above mentioned; and means operating when keys of the two sets aforesaid are acted upon simultaneously by the operator, thereby to release two matrices or type-plates, one from each of the two sets above mentioned, to cause the matrix or type-plate released from the primary-letter set of matrices or type-plates to reach a position in the line of matrices or type-plates being assembled in advance of the position reached by the matrix or type-plate released by the simultaneous action of the operator, from the secondary-letter set of matrices or type-plates.

14. In a line-casting machine or other similar instrument, and in combination, (a) two sets of matrices or type-plates of the same case and face; (b) a set of keys and releasing mechanism controlled by said keys and acting to release the matrices or type-plates of one of the two sets aforesaid; (c) another set of keys, and releasing mechanism controlled by said last-mentioned keys, and acting to release the matrices or type-plates of the other one of the two sets aforesaid; and (d) additional composing mechanism constructed to assemble the matrices or type-plates released from the two sets aforesaid, in due order in the same line.

15. In a line-casting machine, or other similar instrument, means constructed to afford facility to the operator to select a plurality of matrices or type-plates, corresponding to consecutive letters of a word, simultaneously, and including (a) two sets of matrices or type-plates of the same case; (b) a set of keys and releasing mechanism controlled by said keys, acting to release the matrices or type-plates of one of the two sets aforesaid; (c) another set of keys and releasing mechanism controlled by said last-mentioned keys, acting to release the matrices or type-plates of the other one of the two sets aforesaid; and (d) additional composing mechanism whereby the matrices or type-plates released from the two sets aforesaid are arranged in due order in the line; the whole being constructed arranged and operating in such a manner that when keys of the two sets aforesaid are depressed by the operator simultaneously, thereby to free one matrix or type-plate of each set, the matrices or type-plates released, belonging to one set and controlled by the one set of keys, are regularly assembled or disposed in advance, in the line of the matrices or type-plates released simultaneously or substantially simultaneously, but belonging to the other set of matrices or type-plates and controlled by the other set of keys aforesaid.

16. In a line-casting machine, or other similar instrument, means constructed to afford facility to the operator to select a plurality of matrices or type-plates, corresponding to consecutive letters of a word, simultaneously, and including (a) two sets of matrices or type-plates of the same case; (b) a set of keys for the right hand, and releasing mechanism controlled by said keys and acting to release the matrices or type-plates of one of the two sets aforesaid; (c) a set of keys for the left hand and releasing mechanism, controlled by said keys, and acting to release the matrices or type-plates of the other one of the two sets aforesaid; and (d) additional composing mechanism whereby the matrices or type-plates released from the two sets aforesaid are arranged in due order in the line; the whole being constructed, arranged and operating in such a manner that when keys of the two sets aforesaid are depressed by the operator simultaneously, thereby to free one matrix or type-plate of each set, the matrices or type-plates released belonging to one set and controlled by the one set of keys, are regularly assembled or disposed in advance, in the line, of the matrices or type-plates released from the other set aforesaid by the simultaneous acting of the operator upon the other set of keys.

17. In a line-casting machine, or other similar instrument, means constructed to afford facility to the operator to select a plurality of matrices or type-plates, corresponding to consecutive letters of a word, simultaneously, and including (a) a set of keys adapted to be operated by the right hand, and a set of lower-case matrices or type-plates controlled by such keys; (b) a set of keys adapted to be operated by the left hand and another set of lower-case matrices or type-plates controlled by such left-hand keys; (c) means controlled by the right-hand keys, acting to release the matrices or type-plates of the one set, each as required; (d) means, controlled by the left-hand keys, acting to release the matrices or type-plates of the other set, each as required; and (e) additional composing mechanism whereby the matrices or type-plates released, of the two sets aforesaid are arranged, in due order in the line; the whole being constructed, arranged and operating in such a manner that when keys of the two sets aforesaid are depressed by the operator simultaneously, thereby to free one matrix or type-plate of each set, the matrices or type-plates released, belonging to the one set of matrices or type-plates, and controlled by the one set of keys, are regularly assembled or disposed in advance, in the line, of the matrices or type-plates released by or in consequence of a simultaneous action of the operator, but belonging to the other set of matrices or type-plates and controlled by the other set of keys aforesaid.

18. In a line-casting machine, or other similar instrument, means constructed to afford facility to the operator to select a plurality of matrices or type-plates, corresponding to consecutive letters of a word, simultaneously, and including in combination, (a) two sets of matrices or type-plates of the same case; (b) releasing devices for each set of matrices or type-plates; (c) two sets or groups of keys; (d) quick-acting connections between the keys of one set and the releasing devices controlling one of the sets of matrices or type-plates before mentioned; and (e) slow-acting connections between the keys of the other set and the releasing devices controlling the matrices or type-plates of the other set, before mentioned.

19. In a line-casting machine and in combination, (a) two sets of matrices or type-plates of the same case and face; (b) a set of keys and releasing devices controlled thereby, and acting to control the matrices or type-plates of one of the two sets aforesaid; (c) another set of keys and other releasing devices controlled by said keys, and acting to control the matrices or type-plates of the other one of the two sets aforesaid; (d) a conveyer in operative relation to the matrices of the two sets aforesaid, and serving to convey the matrices or type-plates of the two sets aforesaid, when they are released, to the mechanism for arranging them in line, and (e) means constructed to assemble the matrices or type-plates released from the two sets aforesaid in due order into a line.

20. In a line-casting machine, or other similar instrument, means constructed to afford facility to the operator to select a plurality of matrices or type-plates, corresponding to consecutive letters of a word, simultaneously, and including in combination with mechanism for arranging the matrices or type-plates in line, (a) two sets of matrices or type-plates of the same case; (b) two sets of keys; (c) releasing devices for each set of matrices or type-plates, controlled by the corresponding set of keys; and (d) a carrier serving to convey the matrices or type-plates of the two sets aforesaid, after they have been released, to the mechanism before mentioned for arranging them in line; the matrices or type-plates of the two sets aforesaid being disposed in such relation to the carrier before mentioned that the matrices or type-plates of the one set regularly fall upon said carrier nearer to the mechanism before mentioned for arranging the matrices or type-plates in line, (and to which mechanism the matrices or type-plates are being conveyed by the carrier,) than the matrices or type-plates do of the other set, released by a simultaneous action of the operator.

21. In a line-casting machine, or other similar instrument, means constructed to afford facility to the operator to select a plurality of matrices or type-plates, corresponding to consecutive letters of a word, simultaneously, and including (a) two sets of matrices or type-plates of the same case; (b) releasing devices for each set of matrices or type-plates; (c) two sets of keys; (d) quick-acting connections between one set of keys and the releasing devices controlled by said keys and which serve to control one of the two sets of matrices or type-plates aforesaid; (e) slow-acting connections between the other set of keys aforesaid and the releasing devices controlled by such keys and which serve to control the other set of matrices or type-plates aforesaid; and (f) a carrier, serving to convey the matrices or type-plates of the two sets aforesaid, when they are released, to the mechanism whereby they are arranged in line; the matrices or type-plates of the two sets aforesaid being disposed in such relation to the carrier before mentioned that the matrices of the set whose releasing devices are connected with the keys controlling them by quick-acting connections, regularly fall upon said carrier nearer to the mechanism before mentioned whereby said matrices are arranged or composed in line, and to which mechanism the matrices or type-plates are being conveyed by the carrier aforesaid, than the matrices or type-plates do of the other set, whose releasing devices are connected with the keys controlling them by slow-acting connections.

22. In a line-casting machine, or other similar instrument, means constructed to afford facility to the operator to select a plurality of matrices or type-plates, corresponding to consecutive letters of a word, simultaneously, and including in combination, with suitable composing or assembling mechanism, (a) two sets of matrices or type-plates of the same case; (b) releasing devices for each of the sets of matrices or type-plates aforesaid; (c) two sets of keys; (d) quick-acting connections between one set of keys aforesaid and the releasing devices controlling one of the sets of matrices or type-plates aforesaid; and (e) slow-acting connections between the other set of keys aforesaid and the releasing devices controlling the other set of matrices or type-plates aforesaid; the set of matrices or type-plates aforesaid whose releasing devices are connected with the keys controlling them by quick-acting connections, being disposed in proximity to the line of matrices or type-plates being assembled, and the matrices or type-plates of the other set, whose releasing devices are connected with the keys controlling them by slow-acting connections, being disposed more remote from the line of matrices or type-plates being assembled.

23. In a line-casting machine, or other similar instrument, means constructed to afford facility to the operator to select a plurality of matrices or type-plates, corresponding to consecutive letters of a word, simultaneously, and including (a) two sets of matrices or type-plates of the same case; (b) releasing devices, for the two sets of matrices or type-plates aforesaid, whereby the matrices or type-plates of each set are released, as required; (c) two sets of keys, serving to control the two sets of matrices or type-plates aforesaid; and (d)

permutational selecting devices intermediate at least one set of keys and the releasing devices controlled thereby; whereby a few keys are made to control a large number of releasing devices, each as required.

24. In a line-casting machine or other similar instrument, and in combination, (a) two sets of matrices or type-plates of the same case; (b) releasing devices for the two sets of matrices or type-plates aforesaid, whereby the matrices or type-plates of each set are released, as required; (c) two sets of keys serving to control the two sets of matrices or type-plates aforesaid, respectively; (d) permutational selecting devices intermediate one set of keys at least, and the releasing devices controlled thereby, whereby a few keys are made to control a large number of releasing devices, each as required; and (e) means constructed to assemble the matrices or type-plates released from the two sets aforesaid in due order into a line.

25. In a line-casting machine, or other similar instrument, means constructed to afford facility to the operator to select a plurality of matrices or type-plates, corresponding to consecutive letters of a word, simultaneously, and including (a) two sets of matrices or type-plates of the same case; (b) releasing devices for the two sets of matrices or type-plates aforesaid, whereby the matrices or type-plates of each set are released, as required; (c) two sets of keys, serving to control the two sets of matrices or type-plates aforesaid; (d) permutational selecting devices intermediate one set of keys at least and the releasing devices controlled thereby, whereby a few keys are made to control a large number of releasing devices, each as required; and (e) additional composing mechanism whereby the matrices or type-plates of the two sets released, are arranged in due order in a line; the whole being constructed, arranged and operating in such a manner that when keys of the two sets aforesaid are depressed by the operator simultaneously, thereby to free one matrix or type-plate of each set, the matrices or type-plates released belonging to the one set of matrices or type-plates, and controlled by the one set of keys are regularly assembled or disposed in advance, in the line, of the matrices or type-plates released from the other set of matrices or type-plates by the simultaneous acting of the operator upon the other set of keys.

26. In a line-casting machine, or other similar instrument, means constructed to afford facility to the operator to select a plurality of matrices or type-plates, corresponding to consecutive letters of a word, simultaneously, and including in combination, (a) two sets of matrices or type-plates of the same case; (b) releasing devices for each set of matrices or type-plates; (c) two sets of keys; (d) quick-acting connections between the keys of one set and the releasing devices controlling one of the sets of matrices or type-plates before mentioned; (e) slow-acting connections between the keys of the other set and the releasing devices controlling the other set of matrices or type-plates before mentioned; the connections between at least one of the sets of keys before mentioned and the releasing devices controlled by them, being permutational selecting devices, whereby a few keys, acting singly and in different combinations are made to control a large number of releasing devices, each as required.

27. In a line-casting machine or other similar instrument, and in combination, (a) two sets of matrices or type-plates of the same case; (b) releasing devices for each set of matrices or type-plates aforesaid, whereby the different matrices or type-plates are released, as required; (c) a set of keys for the right hand; (d) permutational selecting devices intermediate the keys of the right hand and the releasing devices controlled thereby, whereby a few keys acting singly and in different combinations are made to control a large number of releasing devices, each as required; (e) a set of keys for the left hand; (f) permutational selecting devices, intermediate the keys of the left-hand set and the releasing devices controlled thereby, whereby a few keys are made to control a large number of releasing devices, each as required, and (g) means constructed to assemble the matrices or type-plates released from the two sets aforesaid in due order into a line.

28. In a line-casting machine, or other similar instrument, means constructed to afford facility to the operator to select a plurality of matrices or type-plates, corresponding to consecutive letters of a word, simultaneously, and including in combination, (a) two sets of matrices or type-plates of the same case; (b) releasing devices for each set of matrices or type-plates aforesaid, whereby the different matrices or type-plates are released, as required; (c) a set of keys for the right hand; (d) permutational escapement-selecting devices, intermediate the keys of the right hand and the releasing devices controlled thereby, whereby a few keys acting singly and in different combinations are made to control a large number of releasing devices, each as required; (e) a set of keys for the left hand; and (f) permutational escapement-selecting devices, intermediate the keys of the left-hand set and the releasing devices controlled thereby, whereby a few keys are made to control a large number of escapement devices, each as required; the connections between one set of keys and the releasing devices controlled thereby being quick-acting; and the connections between the other set of keys and the releasing devices controlled by them being slow-acting.

29. In a line-casting machine or other similar instrument, means constructed to afford facility to the operator to select a plurality of matrices or type-plates, corresponding to consecutive letters of a word simultaneously, and including (a) a set of lower-case matrices or type-plates; (b) storing devices for said matrices or type-plates, said storing devices being disposed in proximity to the line of matrices or type-plates being assembled; (c) another set of lower-case matrices or type-plates; and (d) storing devices for said last-mentioned matrices or type-plates, disposed more remote from the line of matrices or type-plates being assembled.

30. In a line-casting machine or other similar instrument, and in combination, (a) a set of lower-case matrices or type-plates; (b) storing devices for said matrices or type-plates, said storing devices being disposed in proximity to the line of matrices or type-plates being assembled; (c) another set of lower-case matrices or type-plates of the same face; (d) storing devices for said last-mentioned matrices or type-plates, disposed more remote from the line of matrices or type-plates being assembled; and (e) composing mechanism constructed to assemble matrices or type-plates of the two sets aforesaid in due order into the same line.

31. In a line-casting machine or other similar instrument, means constructed to afford facility to the operator to select a plurality of matrices or type-plates, corresponding to consecutive letters of a word, simultaneously, and including (a) a set of lower-case matrices or type-plates; (b) storing devices for said matrices or type-plates, said storing devices being disposed in proximity to the line of matrices or type-plates being assembled; (c) another set of lower-case matrices or type-plates; (d) storing devices for said last-mentioned matrices or type-plates, disposed more remote from the line of matrices or type-plates being assembled; and (e) composing mechanism whereby the matrices or type-plates of the two sets aforesaid are arranged in due order in the line.

32. In a line-casting machine or other similar instrument, means constructed to afford facility to the operator to select a plurality of matrices or type-plates, corresponding to consecutive letters of a word simultaneously, and including (a) two sets of matrices or type-plates of the same case, to wit, a set of primary-letter matrices or type-plates and a set of secondary-letter matrices or type-plates; (b) releasing devices controlling the primary-letter matrices or type-plates aforesaid, said releasing devices being disposed in proximity to the line of matrices or type-plates being assembled; and (c) other releasing devices controlling the secondary-letter set of matrices or type-plates aforesaid; the last-mentioned releasing devices being disposed more remote from the line of matrices or type-plates being assembled than the releasing devices controlling the primary-letter set of matrices.

33. In a line-casting machine or other similar instrument, means constructed to afford facility to the operator to select a plurality of matrices or type-plates, corresponding to consecutive letters of a word simultaneously, and including (a) two sets of matrices or type-plates of the same case, to wit, a set of primary-letter matrices or type-plates and a set of secondary-letter matrices or type-plates; (b) releasing devices controlling the primary-letter matrices or type-plates aforesaid, said releasing devices being disposed in proximity to the line of matrices or type-plates being assembled; (c) other releasing devices controlling the secondary-letter set of matrices or type-plates aforesaid; the last-mentioned releasing devices being disposed more remote from the line of matrices or type-plates being assembled than the releasing devices controlling the primary-letter set of matrices; and (d) means whereby the matrices or type-plates released from the two sets aforesaid are arranged in due order in the line.

34. In a line-casting machine or other similar instrument, means constructed to afford facility to the operator to select a plurality of matrices or type-plates, corresponding to consecutive letters of a word simultaneously, and including (a) two sets of matrices or type-plates of the same case; (b) quick-acting selecting mechanism, controlling one set of said matrices, and (c) slow-acting selecting mechanism, controlling the other set of matrices aforesaid.

35. In a line-casting machine or other similar instrument, means constructed to afford facility to the operator to select a plurality of matrices or type-plates, corresponding to consecutive letters of a word simultaneously, and including (a) two sets of matrices or type-plates of the same case; (b) a quick-acting permutational selecting mechanism, controlling one set of said matrices or type-plates, and (c) a slow-acting permutational selecting mechanism, controlling the other set of said matrices or type-plates.

36. In a line-casting machine or other similar instrument, means constructed to afford facility to the operator to select a plurality of matrices or type-plates, corresponding to consecutive letters of a word simultaneously, and including (a) two sets of matrices or type-plates of the same case, one of said sets of matrices or type-plates being disposed in proximity to the line of matrices or type-plates being assembled, and the other of said sets of matrices or type-plates being disposed more remote from the line of matrices or type-plates being assembled; (b) quick-acting selecting mechanism controlling that set of matrices or type-plates before mentioned as being disposed in proximity to the line of matrices or type-plates being assembled, and (c) slow-acting selecting mechanism controlling the other set of matrices or type-plates aforesaid.

37. In a line-casting machine or other similar instrument, means constructed to afford facility to the operator to select a plurality of matrices or type-plates, corresponding to consecutive letters of a word simultaneously, and including (a) two sets of matrices or type-plates of the same case, one of said sets of matrices or type-plates being disposed in proximity to the line of matrices or type-plates being assembled, and the other of said sets of matrices or type-plates being disposed more remote from the line of matrices or type-plates being assembled; (b) quick-acting permutational selecting mechanism controlling that set of matrices or type-plates before mentioned as being disposed in proximity to the line of matrices or type-plates being assembled; and (c) slow-acting permutational selecting mechanism controlling the other set of matrices or type-plates aforesaid.

In testimony whereof I have hereunto set my hand, at Washington, in the District of Columbia, this 11th day of August, A. D. 1897, in the presence of the subscribing witnesses whose names are hereto affixed.

THADDEUS CAHILL.

Witnesses:
GEO. F. CAHILL,
ARTHUR T. CAHILL.